United States Patent
Kageyama et al.

(10) Patent No.: US 6,847,695 B2
(45) Date of Patent: Jan. 25, 2005

(54) NUCLEAR FUEL ASSEMBLY LOWER TIE-PLATE AND METHOD OF ITS ASSEMBLING

(75) Inventors: Takao Kageyama, Kanagawa (JP); Akira Tanabe, Kanagawa (JP); Yuji Iwamoto, Kanagawa (JP); Yasuhiro Masuhara, Kanagawa (JP); Takanori Fukahori, Kanagawa (JP); Akihiro Yamanaka, Kanagawa (JP); Akira Mototani, Kanagawa (JP)

(73) Assignee: Global Nuclear Fuel-Japan Co., Ltd., Tokyo (JP)

( * ) Notice: Subject to any disclaimer, the term of this patent is extended or adjusted under 35 U.S.C. 154(b) by 0 days.

(21) Appl. No.: 10/313,032

(22) Filed: Dec. 6, 2002

(65) Prior Publication Data
US 2003/0128798 A1 Jul. 10, 2003

(30) Foreign Application Priority Data
Dec. 25, 2001 (JP) ..................... P2001-390855

(51) Int. Cl.[7] .............................. G21C 19/42
(52) U.S. Cl. ................. 376/310; 376/352; 376/313
(58) Field of Search ............................. 376/310, 313, 376/444, 352, 446, 443

(56) References Cited

U.S. PATENT DOCUMENTS

| | | | | |
|---|---|---|---|---|
| 4,096,032 A | * | 6/1978 | Mayers et al. | 376/313 |
| 5,390,221 A | | 2/1995 | Dix et al. | |
| 5,488,634 A | | 1/1996 | Johansson et al. | |
| 5,528,641 A | * | 6/1996 | Takeuchi et al. | 376/444 |
| 6,226,343 B1 | * | 5/2001 | Frederickson et al. | 376/444 |

FOREIGN PATENT DOCUMENTS

| | | | |
|---|---|---|---|
| GB | 924213 | * | 4/1963 |
| JP | 7-151882 | | 6/1995 |
| JP | 07-159567 | | 6/1995 |
| JP | 7-159567 | | 6/1995 |
| JP | 7-306284 | | 11/1995 |
| JP | 11-23763 | | 1/1999 |
| JP | 11-023763 | | 1/1999 |
| JP | 2002-62392 | | 2/2002 |
| JP | 2002-062392 | | 2/2002 |

* cited by examiner

Primary Examiner—Jack Keith
Assistant Examiner—Rick Palabrica
(74) Attorney, Agent, or Firm—Nixon & Vanderhye

(57) ABSTRACT

A fuel assembly lower tie-plate with better performance in capturing linearly elongated foreign substances. The lower tie-plate has a screening plate positioned below the network section in the lower tie-plate cavity. The screening plate is arranged substantially horizontally so that the lower tie-plate cavity is divided into upper and lower parts by the screening plate. Tubular filters are attached to the screening plate so that the tubular filters have openings below and above the screening plate. Top ends of the tubular filters are closed, and the openings above the screening plate are formed in side walls of the tubular filters. The lower tie-plate may be assembled by combining the screening plate, the network section and the nozzle section together, after the tubular filters have been attached to the screening plate.

13 Claims, 19 Drawing Sheets

NUCLEAR FUEL ASSEMBLY LOWER TIE-PLATE AND METHOD OF ITS ASSEMBLING

CROSS-REFERENCE TO RELATED APPLICATIONS

This application is based upon and claims the benefits of priority from the prior Japanese Patent Application No. 2001-390855, filed on Dec. 25, 2001; the entire content of which is incorporated herein by reference.

BACKGROUND OF THE INVENTION

This invention is related generally to a lower tie-plate of a nuclear fuel assembly for a light water reactor, and more particularly to a lower tie-plate with better performance in blocking or suppressing flow of foreign substances entrained by the coolant into the fuel portion, in addition to a method of assembling it.

A conventional fuel assembly for a boiling water reactor has a channel box 1 with a substantially square-shaped cross-section, as shown in FIG. 1. The channel box 1 contains a plurality of fuel rods 2 and at least one water rod 3 arranged in a square lattice. An upper tie-plate 4 and a lower tie-plate 5 are attached to the upper and lower ends of the fuel assembly, respectively. A plurality of spacers 6 are attached to the water rod 3 with specified axial intervals there between, so that the fuel rods 2 may be held in a lattice, although only one of the spacers 6 is shown in FIG. 1.

The lower tie-plate 5 has a network section 7 for holding the fuel rods 2 and the water rod 3 directly, and a nozzle section 8 which extends downward from peripheral portion of the network section 7, so that a lower tie-plate cavity 9 may be formed surrounded by the nozzle section 8 below the network section 7. A lower tie-plate inlet opening 10 is formed at the lower end of the nozzle section 8.

Each of the fuel rods 2 has a cladding tube loaded with a plurality of fuel pellets (not shown), and a lower end plug 11 for closing the lower end of the cladding tube. Lower part of the lower end plug 11 is formed in a slim circular cylindrical rod which is inserted through an insertion-hole 13 formed in the network section 7 of the lower tie-plate, so that the lower end plug 11 of the fuel rod is held there.

The water rod 3 is a hollow metal pipe, and has inlet holes 26 slightly above the lower tie-plate 5 and outlet holes 27 slightly below the upper tie-plate 4 in the channel box 1. The coolant flows into the water rod 3 through the inlet holes 26 in liquid phase, flows upward in the water rod 3 remained in liquid phase, and flows out through the outlet holes 27.

The water rod 3 has a lower end plug 12 at its bottom end. The lower end plug 12 of the water rod 3 is similar to the lower end plug 11 of the fuel rod and has a slim circular cylindrical rod shape which is inserted through an insertion hole 13 formed in the network section 7 of the lower tie-plate, so that the lower end plug 12 of the water rod is supported.

The network section 7 of the lower tie-plate has the insertion holes 13 for receiving and supporting the lower end plugs 11 and 12 as described above, as well as through-holes (not shown) for coolant passes there through between adjacent lower end plugs 11 and 12.

The coolant 15 flows into the lower tie-plate cavity 9 through the lower tie-plated inlet opening 10, passes through the through-holes in the network section 7, flows around the fuel rods 2 and the water rod 3 in the channel box 1, and then, flows out of the fuel assembly through the upper tie-plate 4.

The nozzle section 8 of the lower tie-plate has one or more small leakage holes 17 on its sides, so that a small part of the coolant 15 coming to the lower tie-plate cavity 9 flows out of the channel box 1.

Some fuel assemblies with high performance developed recently have filters for preventing foreign substances from entering the fuel assembly. For example, a lower tie-plate design has a network section with through-holes of about 5 mm in diameters which are smaller than those of conventional designs so that the resistance to the flow or the pressure loss may be increased. Such a design may enhance core stability and also may function as a filter for foreign substances.

The foreign substances which may be expected to enter the fuel assemblies may include small metal wastes remained in the reactor primary containment system during the plant construction, metal brush pieces which have broken off during equipment cleansing and broken pieces which may be results of equipment breaches. The foreign substances may be in various shapes including plates, spiral wires and straight wires.

FIG. 2 shows a prior art lower tie-plate having a filter function for foreign substances (See Japanese Patent Disclosure Hei 7-306284). As shown in FIG. 2, lower parts of the lower end plugs 11 and 12 of the fuel rods 2 and the water rod 3, respectively, penetrate the insertion-holes 13 of the network section 7 of the lower tie-plate 5. A screening plate 20 for filtering foreign substances is disposed below the network section 7 and arranged substantially horizontally across the lower tie-plate cavity 9. The screening plate 20 has many small holes 24 for allowing coolant to flow through while blocking foreign substances, as well as the through-holes 21 and 22 for the lower end plugs of the fuel rods 2 and the water rod 3, respectively, penetrate.

Referring to FIG. 2, the coolant 15 flows into the lower tie-plate cavity 9 through the lower tie-plate inlet opening 10, passes through the small holes 24 in the screening plate 20, and then, passes through the through-holes in the network section 7 into the area around the fuel rods 2 and the water rod 3 within the channel box 1. At this time, most of the foreign substances may be prevented from flowing into the channel box 1, since they would not pass through the small holes 24 in the screening plate 20.

The prior-art lower tie-plate described above could prevent the foreign substances which had reached the inlet area of the core from flowing into the core at a certain probability. However, straight and slim foreign substances might possibly pass through the small holes 24 in the screening plate 20 and the through-holes in the network section 7 when the foreign substances were carried in a position vertically elongated along the flow direction, because the small holes 24 in the screening plate 20 and the through-holes in the network section 7 are aligned substantially linearly upward.

BRIEF SUMMARY OF THE INVENTION

Accordingly, it is an object of the present invention to provide a nuclear fuel assembly lower tie-plate improved in performance of blocking especially straight and slim foreign substances. It is another object of the present invention to provide a method of assembling a nuclear fuel assembly lower tie-plate improved in performance of blocking especially straight and slim foreign substances.

There has been provided, in accordance with an aspect of the present invention, a nuclear fuel assembly lower tie-plate comprising: a network section for holding lower parts of fuel rods loaded with nuclear fuel so that the fuel rods are held in a lattice with spaces there between; a nozzle section extending downward from peripheral part of the network section for forming a lower tie-plate cavity below the network section, the nozzle section having an inlet opening at its lower end; a screening plate positioned below the network section in the lower tie-plate cavity, the screening plate being arranged substantially horizontally so that the lower tie-plate cavity is divided into upper and lower parts by the screening plate; and a plurality of tubular filters attached to the screening plate so that the tubular filters each has openings below and above the screening plate; wherein top ends of the tubular filters are closed, and the openings above the screening plate are formed in side walls of the tubular filters.

There has also been provided, in accordance with another aspect of the present invention, a method for assembling a nuclear fuel assembly lower tie-plate, the lower tie-plate comprising: a network section for holding lower parts of fuel rods loaded with nuclear fuel so that the fuel rods are held in a lattice with spaces there between; a nozzle section extending downward from peripheral part of the network section for forming a lower tie-plate cavity below the network section, the nozzle section having an inlet opening at its lower end; a screening plate positioned below the network section in the lower tie-plate cavity, the screening plate being arranged substantially horizontally so that the lower tie-plate cavity is divided into upper and lower parts by the screening plate; and a plurality of tubular filters attached to the screening plate so that the tubular filters each has openings below and above the screening plate; wherein top ends of the tubular filters are closed; the method comprising: a first step of attaching the tubular filters to the screening plate; and a second step of combining the screening plate, the network section and the nozzle section together, after the first step.

There has also been provided, in accordance with yet another aspect of the present invention, a nuclear fuel assembly lower tie-plate comprising: a network section for holding lower parts of fuel rods loaded with nuclear fuel so that the fuel rods are held in a lattice with spaces there between; a nozzle section extending downward from peripheral part of the network section for forming a lower tie-plate cavity below the network section, the nozzle section having an inlet opening at its lower end; a screening plate positioned below the network section in the lower tie-plate cavity, the screening plate being arranged substantially horizontally so that the lower tie-plate cavity is divided into upper and lower parts by the screening plate; and a plurality of tubular filters attached to the screening plate, the tubular filters each having openings below and above the screening plate; wherein: at least part of the fuel rods have lower end plugs including rod portions extending downward; upper parts of the plurality of tubular filters are positioned surrounding the rod portions, and gaps between the upper portions of the tubular filters and the rod portions are substantially closed; and the openings above the screening plate are disposed mainly on side walls of the tubular filters.

There has also been provided, in accordance with yet another aspect of the present invention, a method of assembling a nuclear fuel assembly lower tie-plate, the lower tie-plate comprising: a network section for holding lower parts of fuel rods loaded with nuclear fuel so that the fuel rods are held in a lattice with spaces there between; a nozzle section extending downward from peripheral part of the network section for forming a lower tie-plate cavity below the network section, the nozzle section having an inlet opening at its lower end; a screening plate positioned below the network section in the lower tie-plate cavity, the screening plate being arranged substantially horizontally so that the lower tie-plate cavity is divided into upper and lower parts by the screening plate; and a plurality of tubular filters attached to the screening plate, the tubular filters each having openings below and above the screening plate; wherein: at least part of the fuel rods have lower end plugs including rod portions extending downward; upper parts of the plurality of tubular filters are positioned surrounding the rod portions, and gaps between the upper portions of the tubular filters and the rod portions are substantially closed; and the openings above the screening plate are disposed mainly on side walls of the tubular filters; the method comprising: a first step of fixing the plurality of tubular filters to the screening plate; and a second step of combining the screening plate between the network section and the nozzle section, after the first step.

There has also been provided, in accordance with yet another aspect of the present invention, a method of assembling a nuclear fuel assembly lower tie-plate, the lower tie-plate comprising: a network section for holding lower parts of fuel rods loaded with nuclear fuel so that the fuel rods are held in a lattice with spaces there between; a nozzle section extending downward from peripheral part of the network section for forming a lower tie-plate cavity below the network section, the nozzle section having an inlet opening at its lower end; a screening plate positioned below the network section in the lower tie-plate cavity, the screening plate being arranged substantially horizontally so that the lower tie-plate cavity is divided into upper and lower parts by the screening plate; and a plurality of tubular filters attached to the screening plate, the tubular filters each having openings below and above the screening plate; wherein: at least part of the fuel rods have lower end plugs including rod portions extending downward; upper parts of the plurality of tubular filters are positioned surrounding the rod portions, and gaps between the upper portions of the tubular filters and the rod portions are substantially closed; and the openings above the screening plate are disposed mainly on side walls of the tubular filters; the method comprising: a first step of disposing the screening plate between the network section and the nozzle section; and a second step of inserting the plurality of tubular filters through the inlet opening of the nozzle section and attaching the plurality of tubular filters to the screening plate, after the first step.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 1:
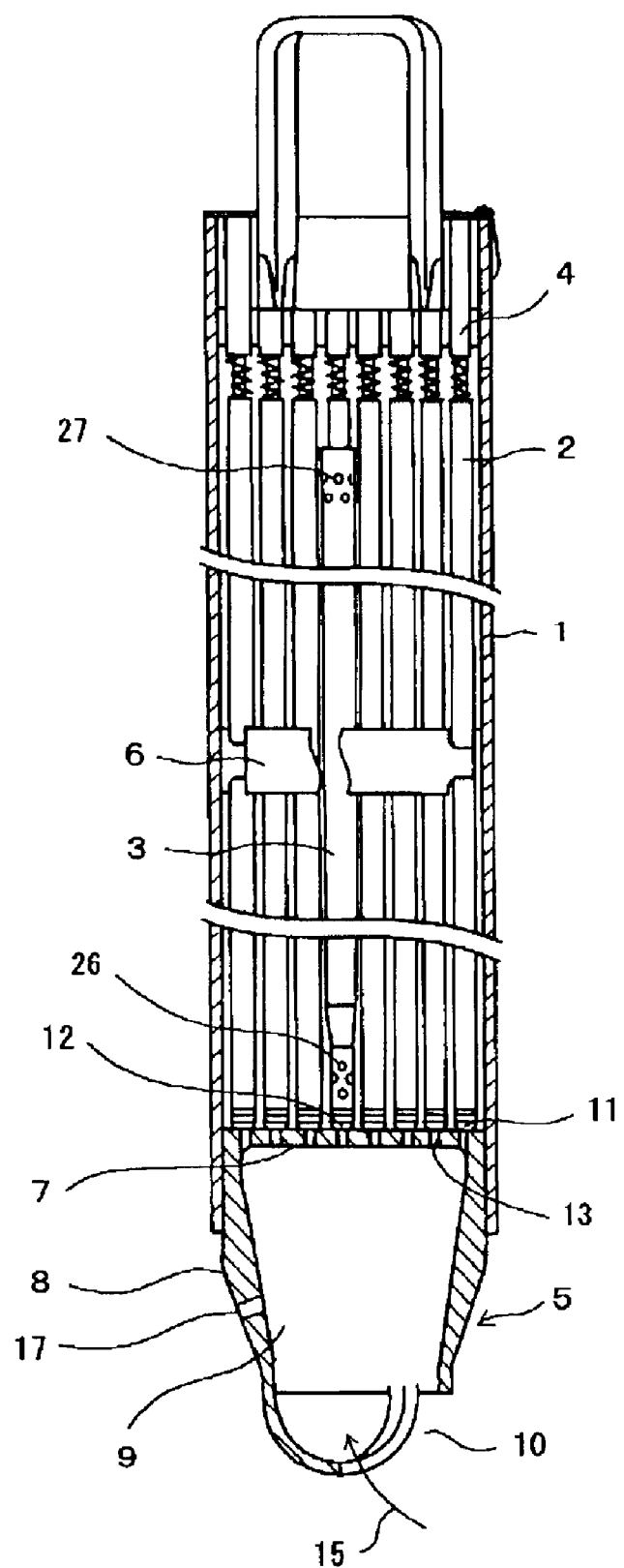
FIG. 1 is an overall vertical cross-sectional view of a prior-art fuel assembly.

In the following description and also in the above description of background of the invention, like reference numerals represent like elements, and redundant description may be omitted.

Figure 4:
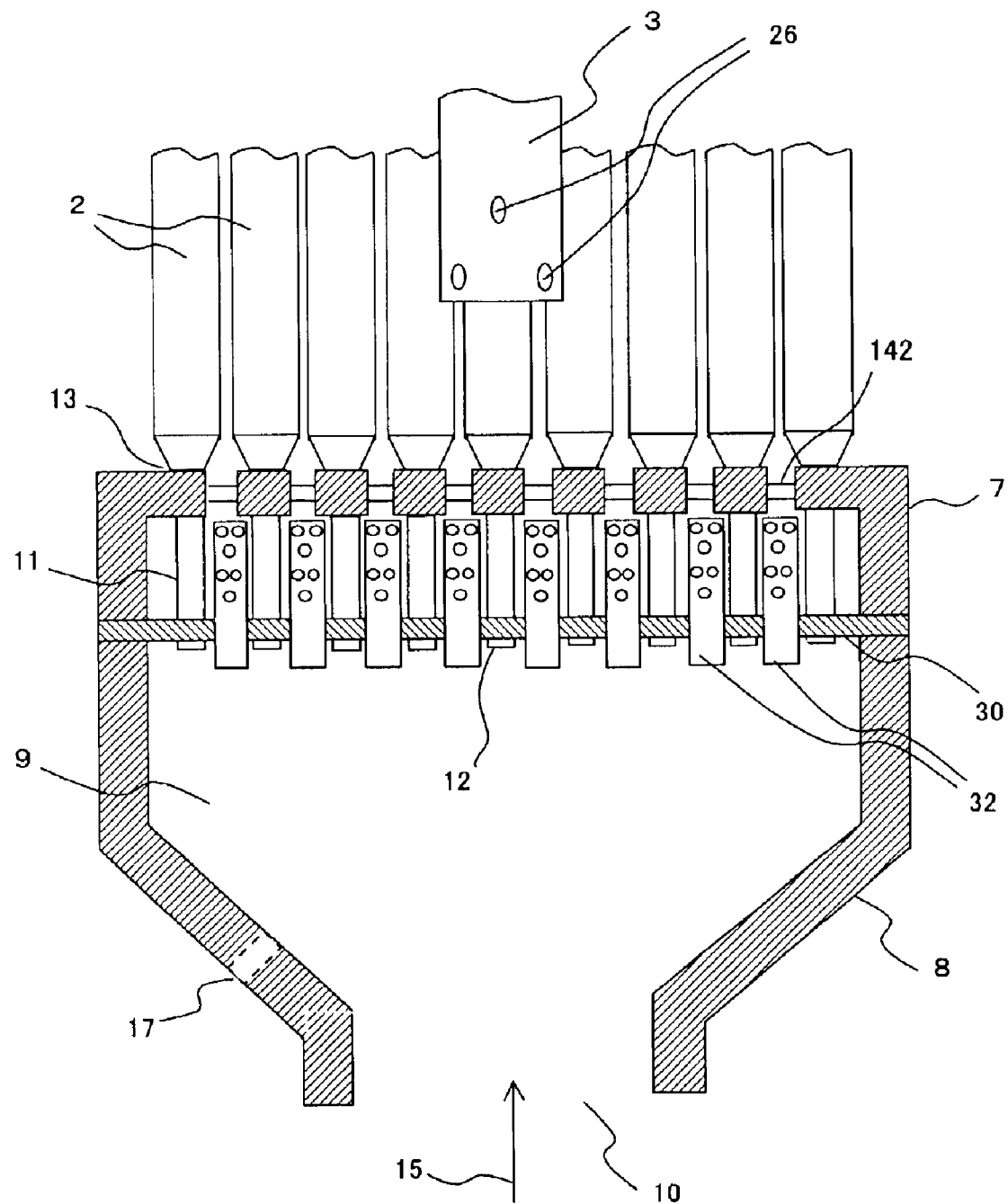
FIG. 4 is a schematic vertical cross-sectional view of a first embodiment of a fuel assembly lower tie-plate according to the present invention.

Now the first embodiment of a lower tie-plate according to the present invention is described referring to FIGS. 4 through 7. The lower tie-plate of this embodiment is not formed as a single unit like the prior-art lower tie-plate. It is rather formed by combining separate parts of a network section 7, a nozzle section 8 and a horizontal flat plate of screening plate 30 between them by welding, for example. Many tubular filters 32 penetrate and are attached vertically to the screening plate 30. In FIG. 4, the channel box 1 (See FIG. 1) is eliminated for illustrative simplicity.

Figure 5:
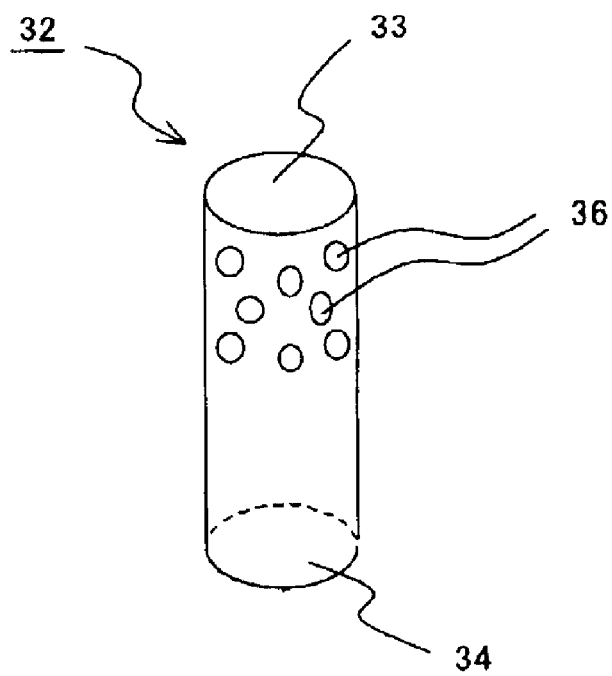
FIG. 5 is a perspective view of the tubular filter shown in FIG. 4, isolated from the other parts.

Each of the tubular filters 32 is shaped in a hollow circular cylinder, and its top end 33 is closed while its bottom end 34 is open as shown in FIG. 5. Each of the tubular filters 32 may have a diameter of 5 mm and a height of 50 mm, for example. Many small holes 36 are formed in upper part of the side wall of each of the filters 32. The diameters of the small holes 36 may be about 2 mm, for example.

Figure 6:
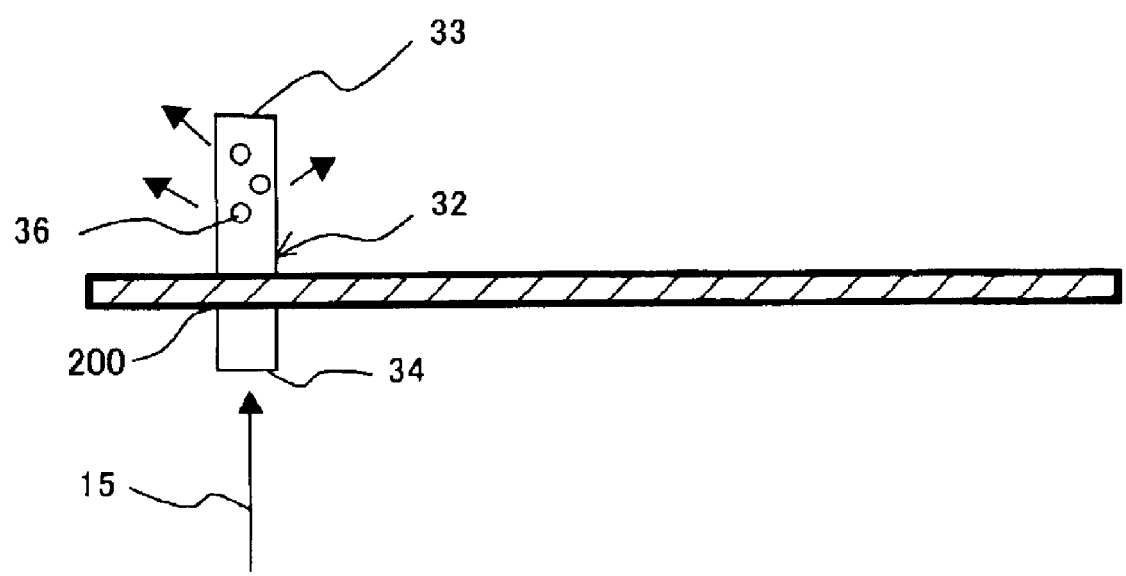
FIG. 6 is a schematic elevational view when only one of the tubular filter shown in FIGS. 4 and 5 is attached to the screening plate.

Each of the filters 32 penetrates the screening plate 30 at one of screening-plate bores 200 and is fixed so that the screening plate 30 may be positioned between the top bottom 33 and the bottom end 34 of the filter 32, and all of th small holes 36 may be positioned above the screening plate 30, as shown in FIG. 6.

Figure 7:
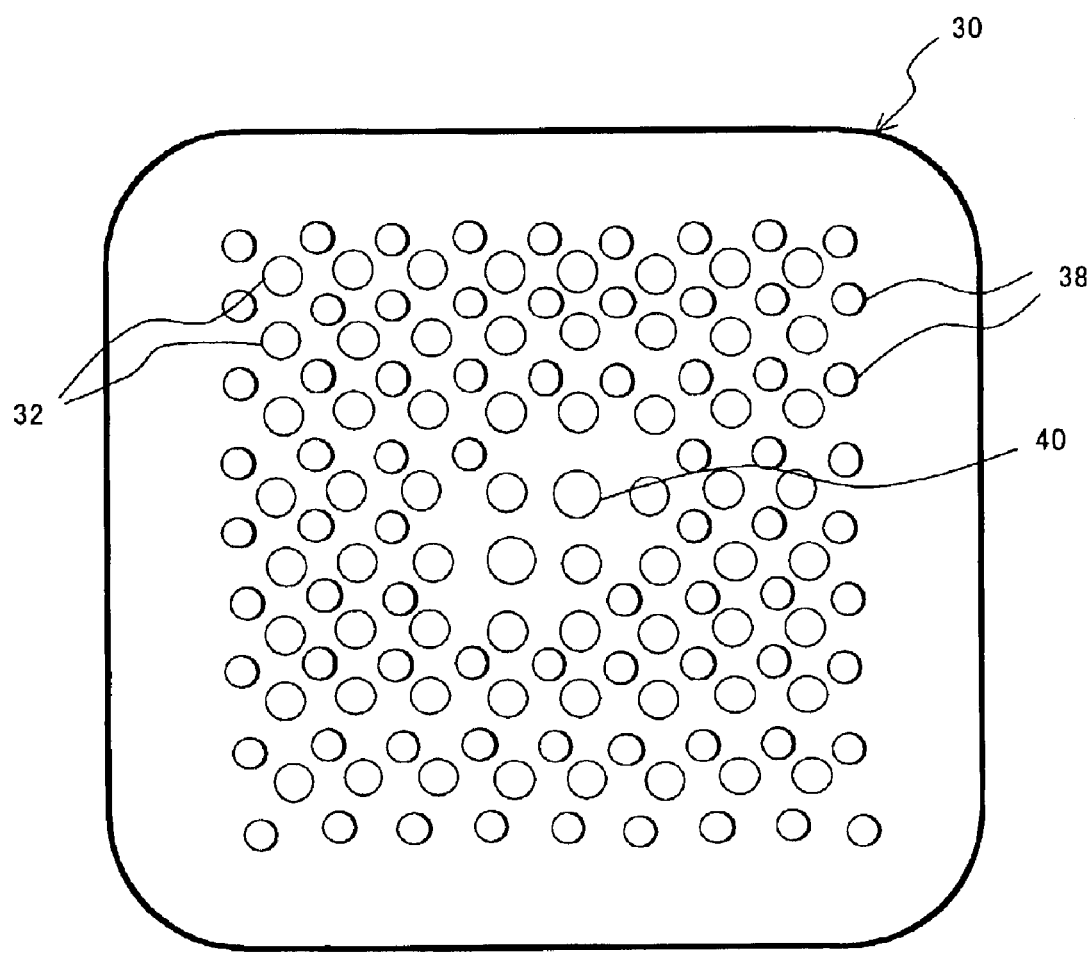
FIG. 7 is a schematic plane view of the screening plate with the tubular filters shown in FIGS. 4 and 5 attached thereto.

As shown in FIG. 7, the screening plate 30 has tubular filters 32 which are attached to the screening plate 30 and arranged in a lattice, as well as holes 38 and 40 for the lower end plugs 11 and 12 of the fuel rods 2 and water rods 3, respectively, to penetrate. The screening-plate bores 200 for attaching the tubular filters 32 to the screening plate 30 have diameters substantially equal to the outer diameters of the filters 32 so as to prevent foreign substances (not shown) in the coolant from passing through the gaps between the screening-plate bores 200 and the filters 32. The holes 38 and 40 have diameters slightly larger than the outer diameters of the lower end plugs 11 and 12, respectively, so as to prevent foreign substances in the coolant from passing through the gaps between the holes 38 and 40 in the screening plate 30 and the lower end plugs 11 and 12.

The holes 38 and 40 are aligned vertically with the lower end plugs 11 and 12 or they are arranged in the same horizontal positions with the fuel rods 2 and the water rods 3. The tubular filters 32 are positioned at the centers between mutually adjacent lower end plugs 11 and 12.

When the lower tie-plate of this embodiment is assembled, the holes 38 and 40 for the lower end plugs 11 and 12, respectively, to penetrate the screening plate 30 and the screening-plate bores 200 for the tubular filters 32 to penetrate the screening plate 30 are formed first. Then, the filters 32 are fixed in the screening-plate bores 200 by welding, for example. Then, the screening plate 30 with the filters 32 are disposed between the network section 7 and the nozzle section 8, and they are integrated together by welding, for example.

Figure 2:
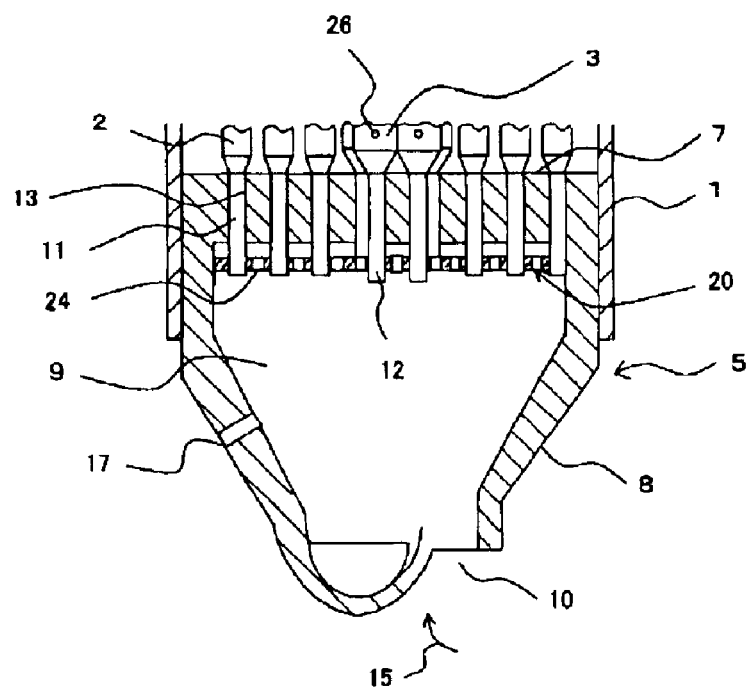
FIG. 2 is an enlarged vertical cross-sectional view in the vicinity of the lower tie-plate shown in FIG. 1.
Figure 3:
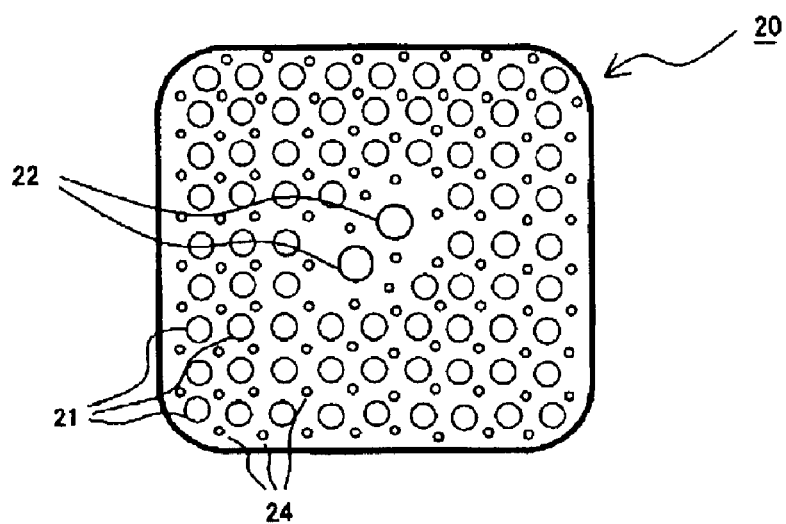
FIG. 3 is a plane view of the screening plate shown in FIG. 2, isolated from the other parts.

The lower tie-plate of the prior art shown in FIG. 2 was formed as a single unit including the network section 7, the nozzle section 8 and the screening plate 30 by casting. Therefore, it was difficult to attach tubular filters 32 to the screening plate 30. On the other hand, the lower tie-plate of the present embodiment is assembled after the network section 7, the nozzle section 8 and the screening plate 30 with the filters 32 are formed separately. Therefore, the tubular filters 32 can be easily attached to the screening plate 30 before the screening plate 30 is assembled with the network section 7 and the nozzle section 8.

In operation of this embodiment, coolant 15 entraining foreign substances flows into the lower tie-plate cavity 9 through the lower tie-plate inlet opening 10 formed at the bottom end of the nozzle section 8, as shown in FIG. 4. The coolant 15 flows into the tubular filters 32 through the lower ends 34 of the filters 32, and flows out through the small holes 36, as best shown in FIG. 6. Since the flow direction changes in the filters 32, foreign substances in shapes of wires of 20 to 30 mm length, for example, would be trapped in the filters 32. Foreign substances in shapes of small plates would be trapped at the bottom ends 34 of the filters 32.

The coolant 15 which has come out of the filters 32 through the small holes 36 goes upward through the flow passages 142 between the lower end plugs 11 and 12 in the network section 7, and then, to the area around the fuel rods 2 and the water rods 3.

Some coolant would flow upward through the gaps between the holes 38 and 40 in the screening plate 30 and the lower end plugs 11 and 12 which penetrate the holes 38 and 40, but foreign substances would not pass through them because the gaps are small.

The small holes 36 can be in any shapes including ellipses, semi-circles, crosses, stars, crescent shapes and polygons as well as circles. The tubular filters 32 can be in shapes of polygonal cylinders, circular cones, polygonal cones, serial combinations of circular cylinders and circular cones, or serial combinations of circular cylinders and polygonal cones, for example.

Now other embodiments utilizing alternative tubular filters are disclosed referring to FIGS. 8 to 18 with which the filters 32 of the first embodiment can be replaced. The other features of the lower tie-plate are similar to those of the first embodiment.

Figure 8:
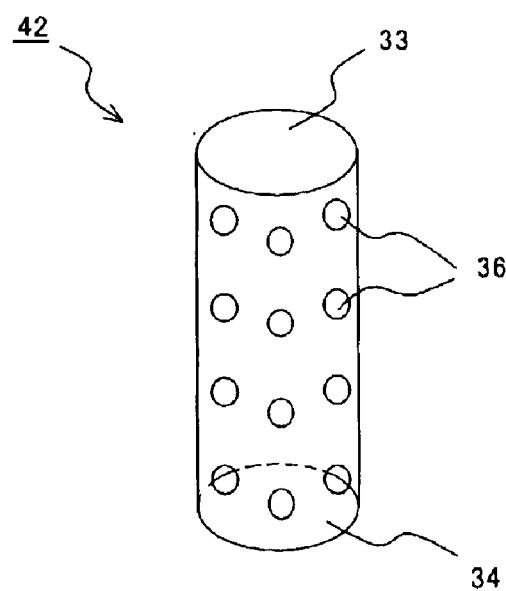
FIG. 8 is a perspective view of a tubular filter, isolated from the other parts, of a second embodiment of a fuel assembly lower tie-plate according to the present invention.

FIG. 8 shows a tubular filter 42 of the second embodiment. This filter 42 has small holes 36 not only in the upper part but in the whole part of the side wall. The other features are similar to those of the filter 32 of the first embodiment. When the filter 42 is attached to the screening plate 30 as shown in FIG. 7, the small holes 36 are positioned not only above but also below the screening plate 30. Therefore, coolant would flow into the filter 42 not only through the open lower end 34 but also through the small holes 36 below the screening plate 30. Thus, probability of local flow blockage in the filter 42 due to the foreign substances in the coolant can be lowered.

Figure 9:
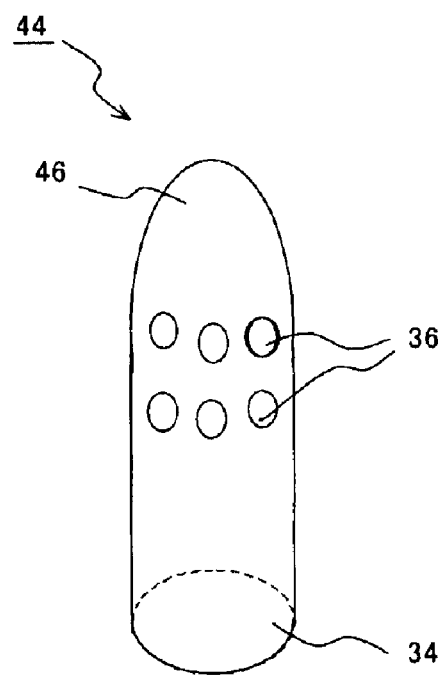
FIG. 9 is a perspective view of a tubular filter, isolated from the other parts, of a third embodiment of a fuel assembly lower tie-plate according to the present invention.

FIG. 9 shows a tubular filter 44 of the third embodiment. This filter 44 has a top end 46 shaped in a circular cone or a dome which is upwardly tapered. The other features are similar to those of the filter 32 of the first embodiment. According to this embodiment, the upward flow passages for the coolant which has flown out of the filter 44 through the small holes 36 expand gradually toward the network section 7 of the lower tie-plate, so that the flow resistance can be reduced.

Figure 10:
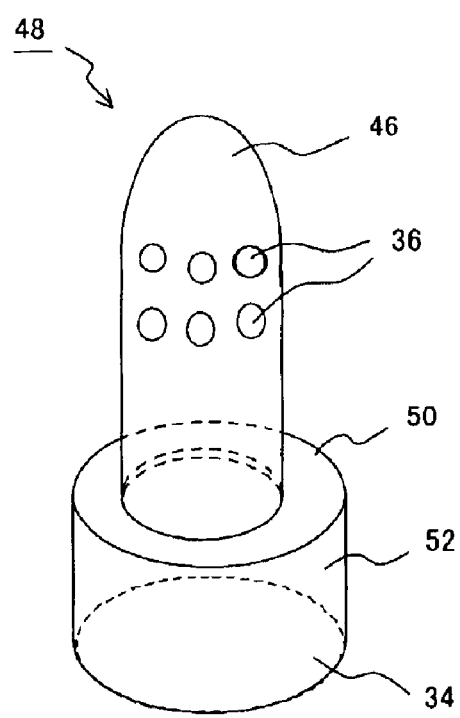
FIG. 10 is a perspective view of a tubular filter, isolated from the other parts, of a fourth embodiment of a fuel assembly lower tie-plate according to the present invention.

FIG. 10 shows a tubular filter 48 of the fourth embodiment, which is a modification of the third embodiment shown in FIG. 9. The filter 48 has a step 50 on the side wall below which a larger-diameter tubular portion 52 is formed. The upper section above the step 50 is shaped similar to the filter 44 of the third embodiment and has top end 46 shaped in a circular cone or a dome which is upwardly tapered. Many small holes 36 are disposed on the side wall above the step 50. The bottom end 34 of the larger-diameter tubular portion 52 is open while the side wall of the larger-diameter tubular portion 52 is closed.

This filter 48 is easily positioned in the screening plate 30 due to the step 50. The filter 48 may be inserted into the screening-plate bore 200 upwardly from the bottom, and it is fixed to the screening plate 30 by welding, for example, when the step 50 in the filter 48 contacts the bottom surface of the screening plate 30.

Figure 11:
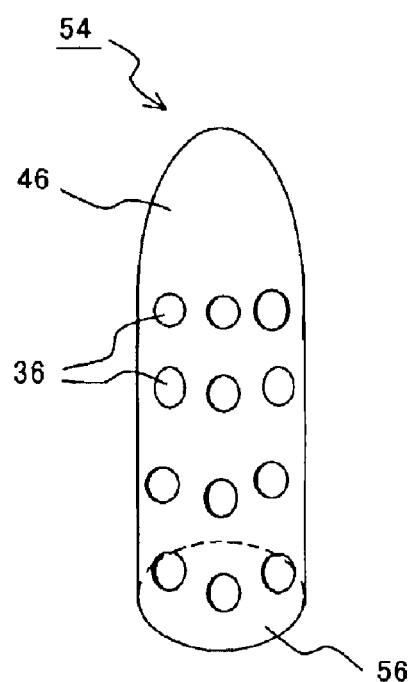
FIG. 11 is a perspective view of a tubular filter, isolated from the other parts, of a fifth embodiment of a fuel assembly lower tie-plate according to the present invention.

FIG. 11 shows a tubular filter 54 of the fifth embodiment, which is a modification of the third embodiment shown in FIG. 9. The bottom end 56 of the filter 54 is closed. The filter 54 has many small holes 36 on its whole side wall not only in the upper part but also in the lower part. When the filter 54 is inserted in the screening-plate bore 200 and fixed to the screening plate 30, the small holes 36 are positioned above and below the screening plate 30 similarly to the second embodiment shown in FIG. 8.

In operation of this embodiment, the coolant 15 flows into the lower tie-plate cavity 9 through the lower tie-plate inlet opening 10 at the lower end of the nozzle section 8, then it flows into the tubular filter 54 through the small holes 36 in the side wall of the filter 54 below the screening plate 30, and then it flows out through the small holes 36 above the screening plate 30.

Since the bottom end 56 of the filter 54 is closed in this embodiment, the foreign substances in the coolant would remain in the filter 54. Thus, the foreign substances may be taken out of the reactor vessel (not shown) in a relatively high probability when the fuel assembly is taken out. If the bottom end were open, the foreign substances trapped in the filter would fall back due to gravity when the coolant flow had stopped, and they would possibly fall down through the lower tie-plate inlet opening 10 to the lower plenum or bottom of the reactor pressure vessel to be accumulated there.

Figure 12:
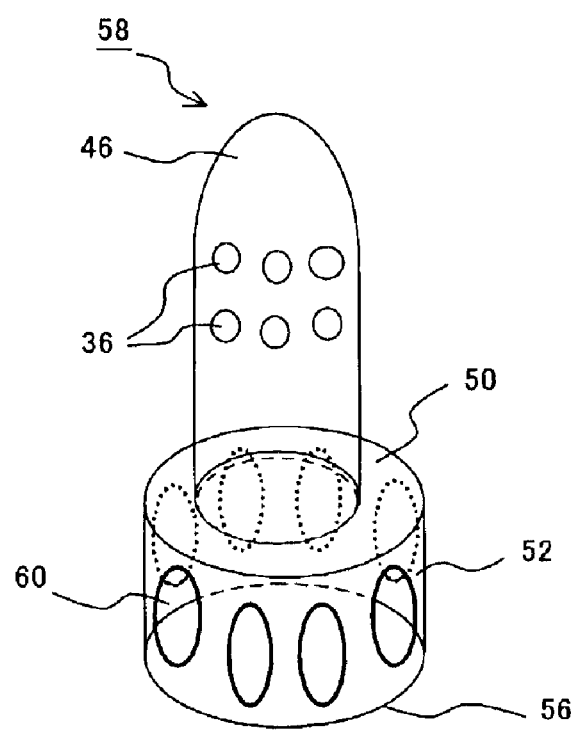
FIG. 12 is a perspective view of a tubular filter, isolated from the other parts, of a sixth embodiment of a fuel assembly lower tie-plate according to the present invention.

FIG. 12 shows a tubular filter 58 of the sixth embodiment, which is a combination of the fourth embodiment shown in FIG. 10 and the fifth embodiment shown in FIG. 11. The filter 58 has a step 50 on the side wall below which a larger-diameter tubular portion 52 is formed as in the fourth embodiment. The portion above the step 50 of this embodiment is similar to that of the filter 54 of the fifth embodiment, and has a top end 46 shaped in a circular cone or a dome which is upwardly tapered. The bottom end 56 of the larger-diameter tubular portion 52 is closed similarly to that of the fifth embodiment. The side wall of the larger-diameter tubular portion 52 has many small holes 60.

The small holes 60 in the larger-diameter tubular portion 52 is positioned below the screening plate 30 when the filter 58 is attached to the screening plate 30 so that the step 50 contacts the bottom surface of the screening plate 30, similarly to the fourth embodiment.

Figure 13:
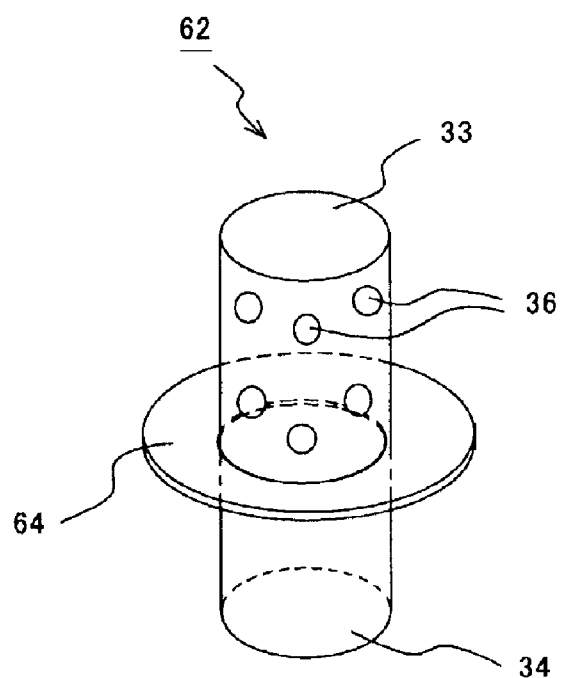
FIG. 13 is a perspective view of a tubular filter, isolated from the other parts, of a seventh embodiment of a fuel assembly lower tie-plate according to the present invention.

FIG. 13 shows a tubular filter 62 of the seventh embodiment, which is similar to the filter 32 of the first embodiment shown in FIGS. 5 and 6, except that a horizontal annular collar 64 is attached to the outer surface of the side wall of the filter 62 between the top end 33 and the lower end 34, by welding, for example. According to this embodiment, since the annular collar 64 is attached to the filter 62, the filter 62 can be easily positioned on the screening plate 30, and can be firmly fixed to the screening plate 30 by welding the annular collar 64 and the screening plate 30 together, for example.

Figure 14:
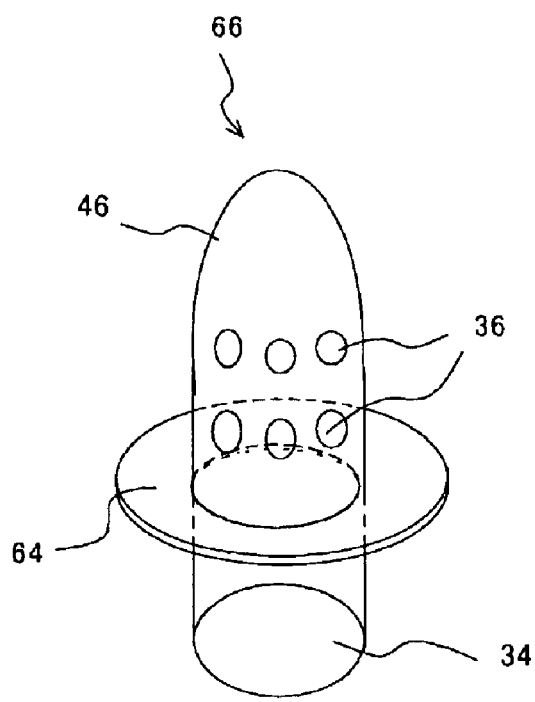
FIG. 14 is a perspective view of a tubular filter, isolated from the other parts, of an eighth embodiment of a fuel assembly lower tie-plate according to the present invention.

FIG. 14 shows a tubular filter 66 of the eighth embodiment, which has the horizontal annular collar 64 of the seventh embodiment shown in FIG. 13 on the side wall of the tubular filter 44 of the third embodiment shown in FIG. 9. This embodiment has both advantages of the third and the seventh embodiments although the production cost may be higher.

Figure 15A:
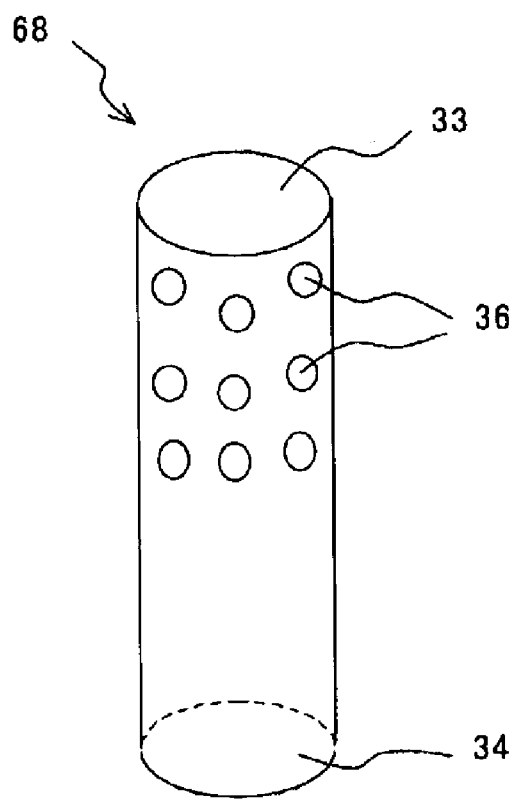
FIG. 15A is a perspective view of a tubular filter, isolated from the other parts, of a ninth embodiment of a fuel assembly lower tie-plate according to the present invention.
Figure 15B:
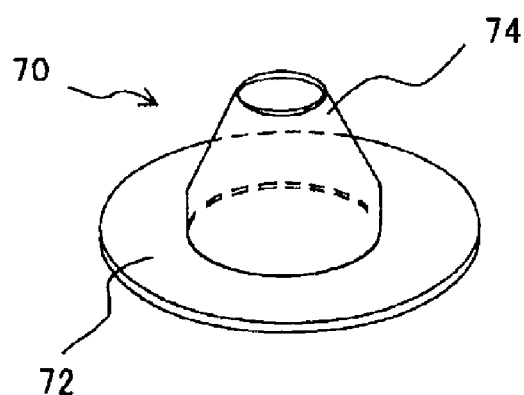
FIG. 15B is a perspective view of a bottom body adaptive to be combined with the tubular filter shown in FIG. 15A.

FIG. 15A shows a tubular filter 68 of the ninth embodiment, which is similar to the filter 32 of the first embodiment shown in FIGS. 5 and 6, except that the filter 68 is not inserted in the screening-plate bore 200 but is disposed on the upper surface of the screening plate 30 over the screening-plate bore 200. A bottom body 70 shown in FIG. 15B is disposed on the bottom surface of the screening plate 30 at the screening-plate bore 200. The bottom body 70 has a horizontal annular collar 72 and a tubular part 74 which extends upward from the inner ridge of the annular collar 72. The upper part of the tubular part 74 is tapered upward and the top end of it is open.

When the tubular filter 68 is attached to the screening plate 30, the tubular part 74 of the bottom body 70 is inserted from the bottom into the screening-plate bore 200 so that the annular collar 72 can contact the bottom surface of the screening plate 30. Then, the annular collar 72 is fixed to the bottom surface of the screening plate 30 by welding, for example. At that time, the tubular part 74 extrudes upward above the upper surface of the screening plate 30. Then, the tubular filter 68 is disposed over the tubular part 74 on the upper surface of the screening plate 30, and is fixed by welding, for example.

According to this embodiment, the tubular filter 68 can be easily positioned and firmly fixed to the screening plate 30.

Figure 16A:
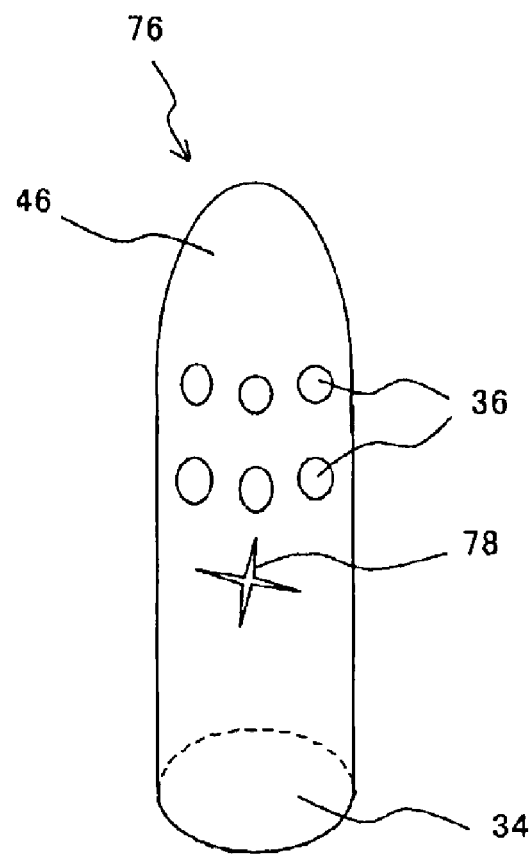
FIG. 16A is a perspective view of a tubular filter, isolated from the other parts, of a tenth embodiment of a fuel assembly lower tie-plate according to the present invention.
Figure 16B:
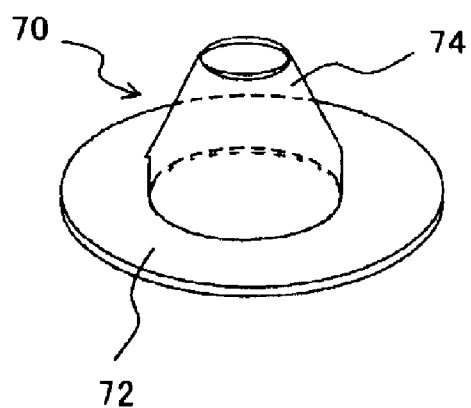
FIG. 16B is a perspective view of a bottom body adaptive to be combined with the tubular filter shown in FIG. 16A.

FIG. 16A shows a tubular filter 76 of the tenth embodiment, which is similar to the tubular filter 44 of the third embodiment shown in FIG. 9 except that the side wall has a star-shaped small hole 78 as well as circular small holes 36. The tubular filter 76 is positioned fixed on the upper surface of the screening plate 30 by the bottom body 70 as shown in FIG. 16B, similarly to the ninth embodiment shown in FIGS. 15A and 15B.

Figure 17:
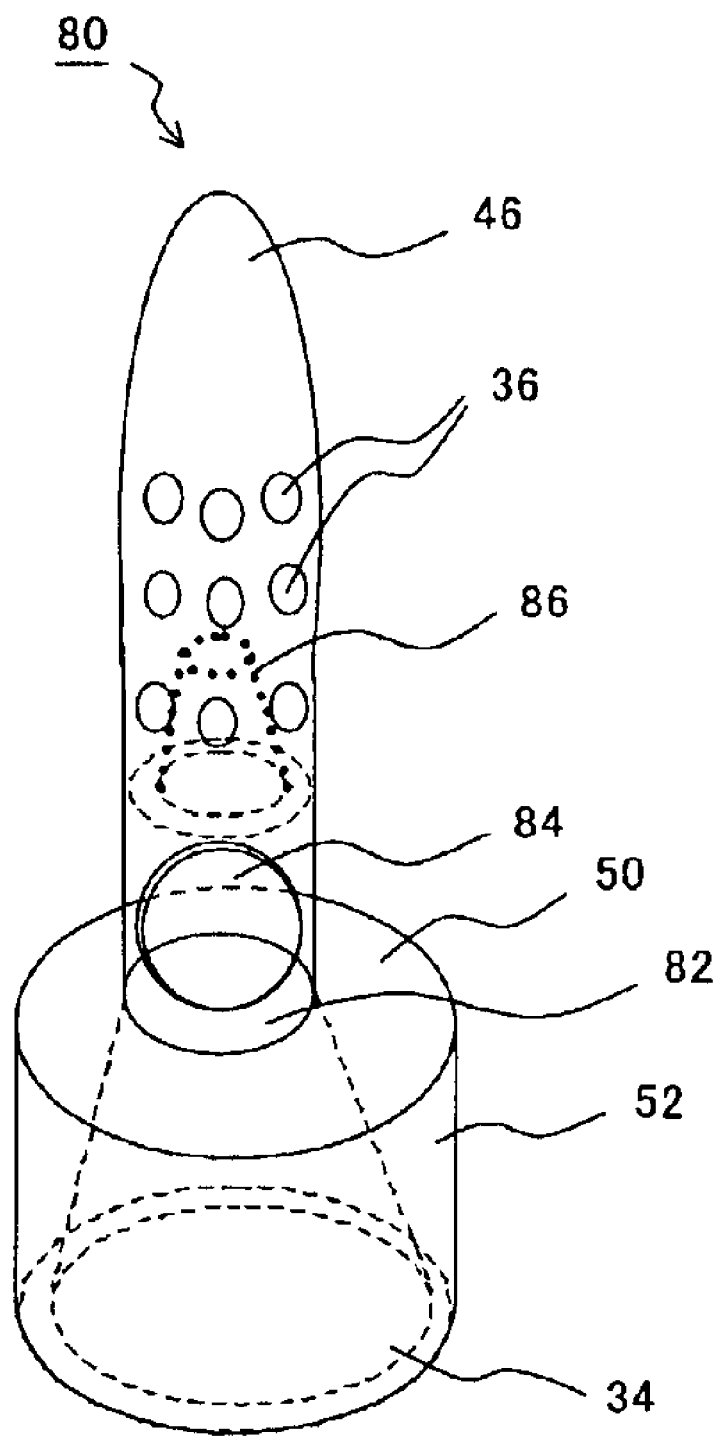
FIG. 17 is a perspective view of a tubular filter, isolated from the other parts, of an eleventh embodiment of a fuel assembly lower tie-plate according to the present invention.

FIG. 17 shows a tubular filter 80 of the ninth embodiment, which is similar to the fourth embodiment shown in FIG. 10 with exceptions described below. The inner space of the large-diameter tubular portion 52 below the level of the step 50, which corresponds to the level of the screening plate 30 when the filter 80 is attached to the screening plate 30, is tapered from the bottom (inlet) end 34 toward the upper (exit) end 82. The diameters of the inner space may be 10 mm at the bottom end 34 and 6 mm at the upper end 82, for example.

A large circular side hole 84, the diameter of which may be 5 mm, for example, is formed in the side wall slightly above the step 50. In addition, many small holes 36, the diameter of which may be 2 mm, for example, are formed in the side wall above the large circular side hole 84. A horizontal annular collar 85 is attached to the inner surface of the side wall between the large circular side hole 84 and the small holes 36. An inner tapered tube 86, which is upwardly tapered, is attached to the annular collar 85, so that the bottom end of the tube 86 fits the central opening of the annular collar 85.

The flow passage in the filter 80 above the step 50 may have a diameter of 5 mm, the central opening of the annular collar 85 may have a diameter of 4 mm, and the top open end of the inner tapered tube 86 may have a diameter of 3 mm, for example.

In operation, the coolant flows upward into the filter 80 through the bottom end 34 and the top end 82 of the larger-diameter cylindrical portion 52. Since the flow passage in the large-diameter tubular portion 52 tapers upward, a jet is formed. Therefore, the wire-shaped foreign substances in the coolant would go upward and is accelerated in the inner tapered tube 86, instead of going out horizontally through the large circular side hole 84.

At the same time, small plate-shaped foreign substances in the coolant would be blocked at the bottom end 34 of the filter 80. If a large volume of foreign substances emerged, the foreign substances would go out of the filter 80 through the large circular side hole 84, and probability of flow blockage would be reduced.

Figure 18:
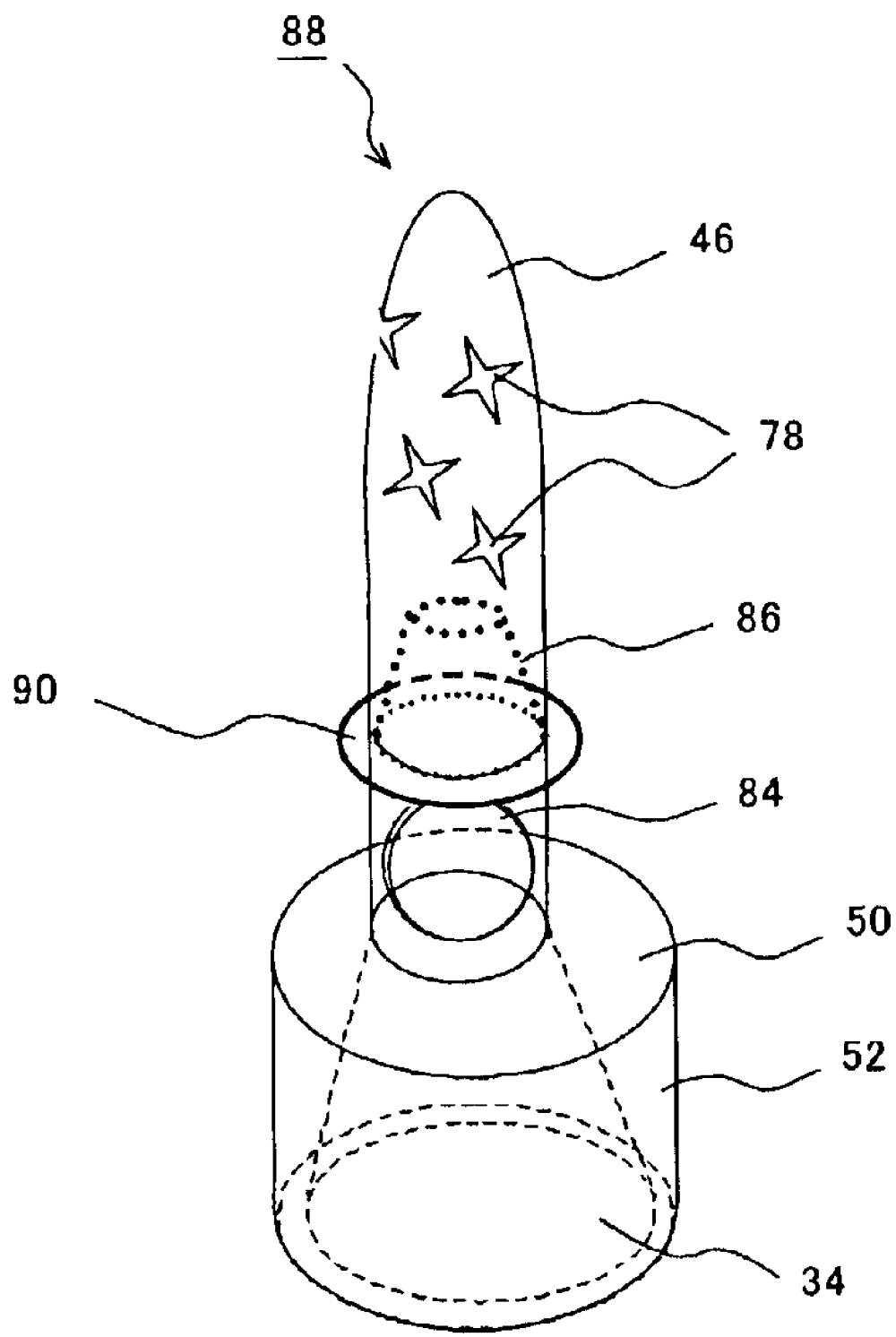
FIG. 18 is a perspective view of a tubular filter, isolated from the other parts, of a twelfth embodiment of a fuel assembly lower tie-plate according to the present invention.

FIG. 18 shows a tubular filter 88 of the twelfth embodiment, which is similar to the eleventh embodiment shown in FIG. 17 with exceptions described below. The tubular filter 88 has a horizontal annular collar 90 outside of the side wall instead of the annular collar 85 inside of the side wall (FIG. 17). An inner tapered tube 86 is disposed within the side wall so that the flow passage in the tube 86 may be tapered upward from the level of the annular collar 90, similarly to the eleventh embodiment.

According to this embodiment, coolant flow contracts smoothly upward passing the step 50 into the inner tapered tube 86 without abrupt contraction at the annular collar 90, resulting in smoother flow than the eleventh embodiment. The inner tapered tube 86 is attached to the annular collar 90 before the filter 88 is assembled. The tubular side wall is divided into two parts, the parts above and below the annular collar 90. The annular collar 90 with the inner tapered tube 86 is disposed between the two parts of the tubular side wall, and then, they are combined together.

This embodiment has small star-shaped holes 78 on the side wall instead of the circular small holes 36 (FIG. 17). The function of the small star-shaped holes 78 is substantially the same as the function of the small circular-shaped holes 36.

Figure 19:
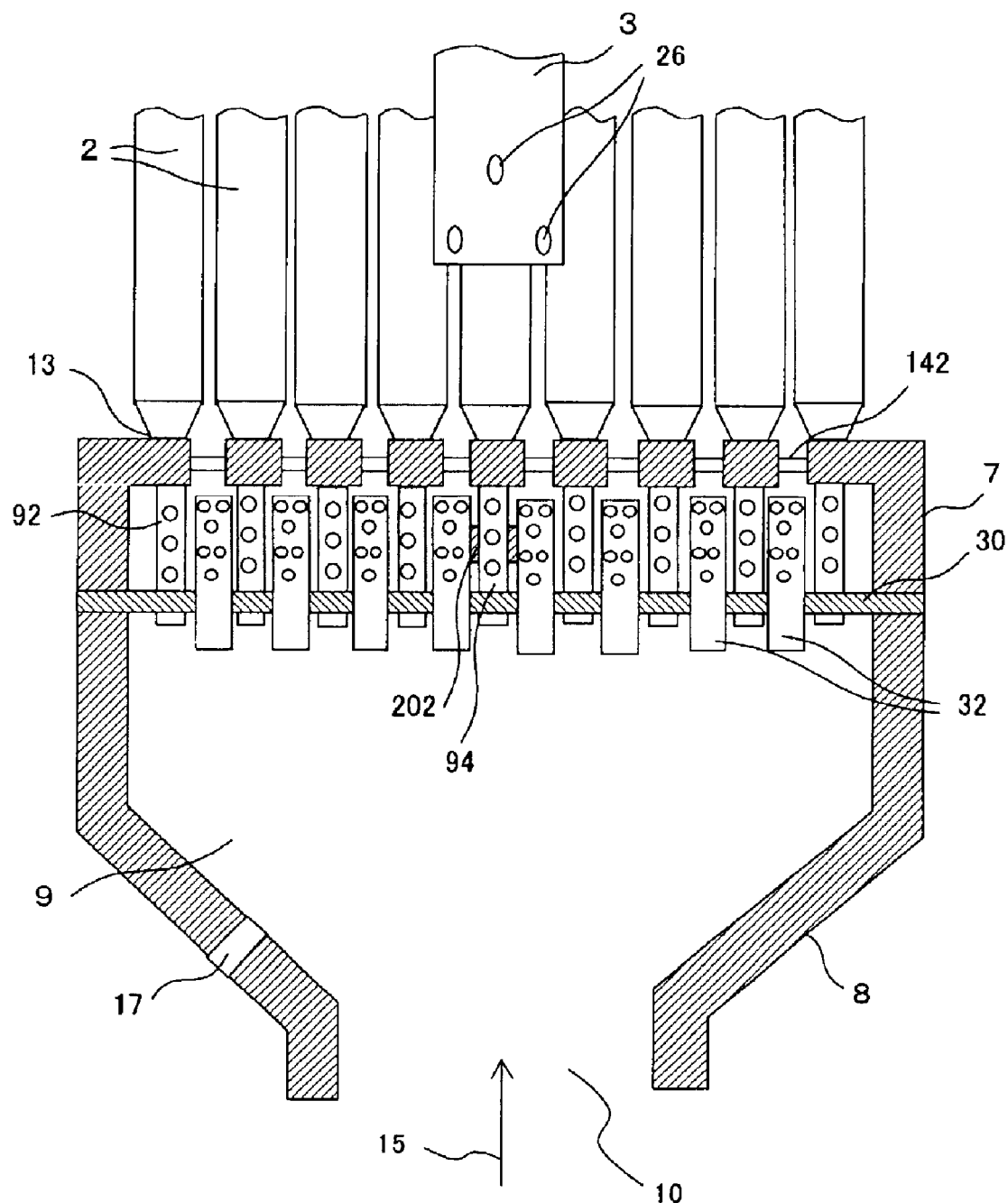
FIG. 19 is a schematic vertical cross-sectional view of a thirteenth embodiment of a fuel assembly lower tie-plate and its vicinity according to the present invention.

FIG. 19 shows a lower tie-plate of the thirteenth embodiment which is similar to the first embodiment shown in FIG. 4 with exceptions described below. Portions of the lower end plugs 92 and 94 of the fuel rods and the water rods, respectively, below the network section 7 are hollow, and flow passages are formed in them where foreign substances may be trapped. Thus, the foreign substances may be trapped not only at the tubular filters attached to the screening plate 30 similarly to the first embodiment, but also at the lower end plugs 92 and 94.

Alternatively, separate filters may be attached to the lower end plugs 92 and 94 instead of forming filters within the lower end plugs 92 and 94 themselves by forming flow passages in them.

In addition, any combinations of the second to the twelfth embodiments described above and the lower end plugs 92 and 94 with functions of trapping foreign substances can be possible.

Figure 20:
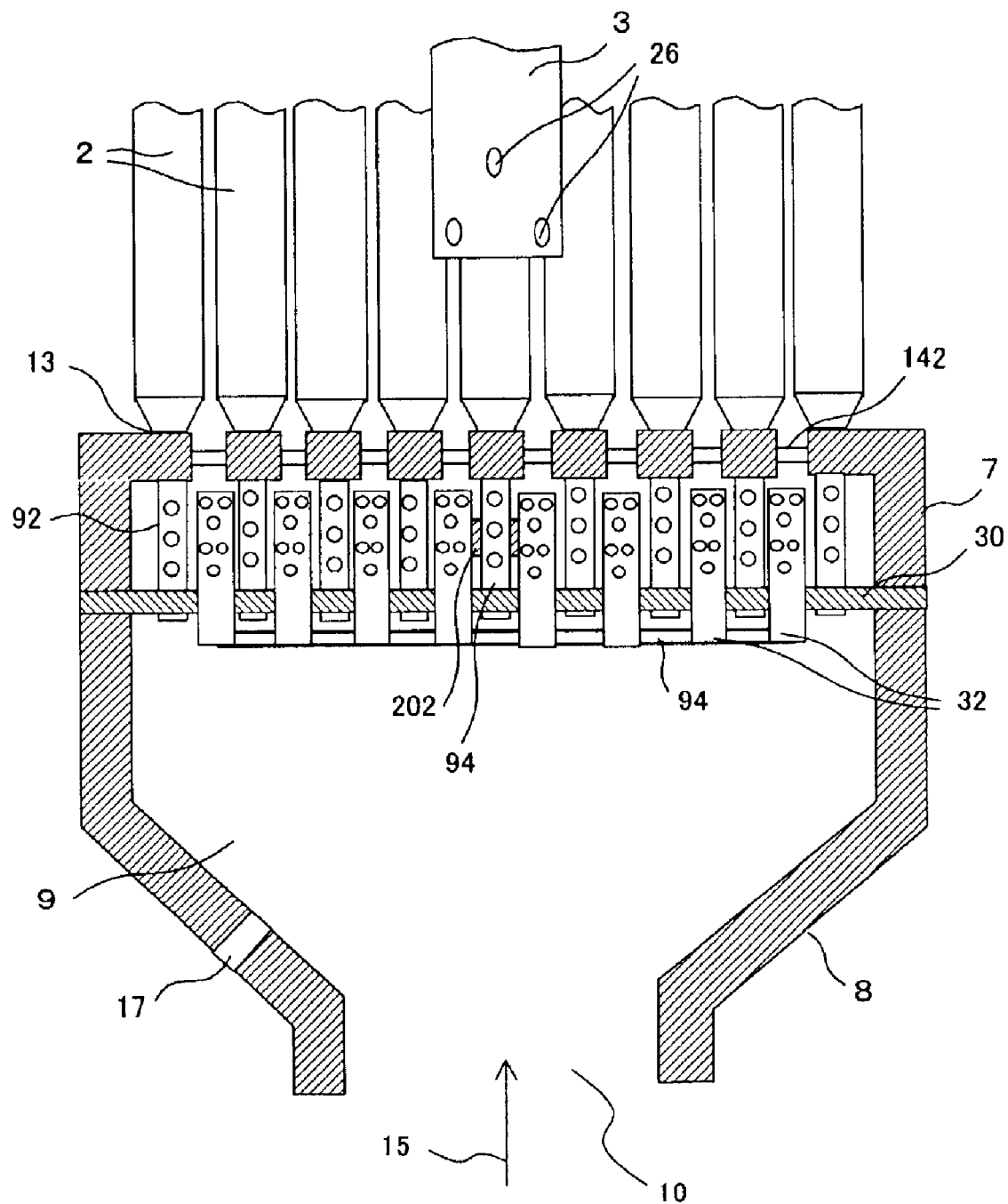
FIG. 20 is a schematic vertical cross-sectional view of a fourteenth embodiment of a fuel assembly lower tie-plate and its vicinity according to the present invention.
Figure 21:
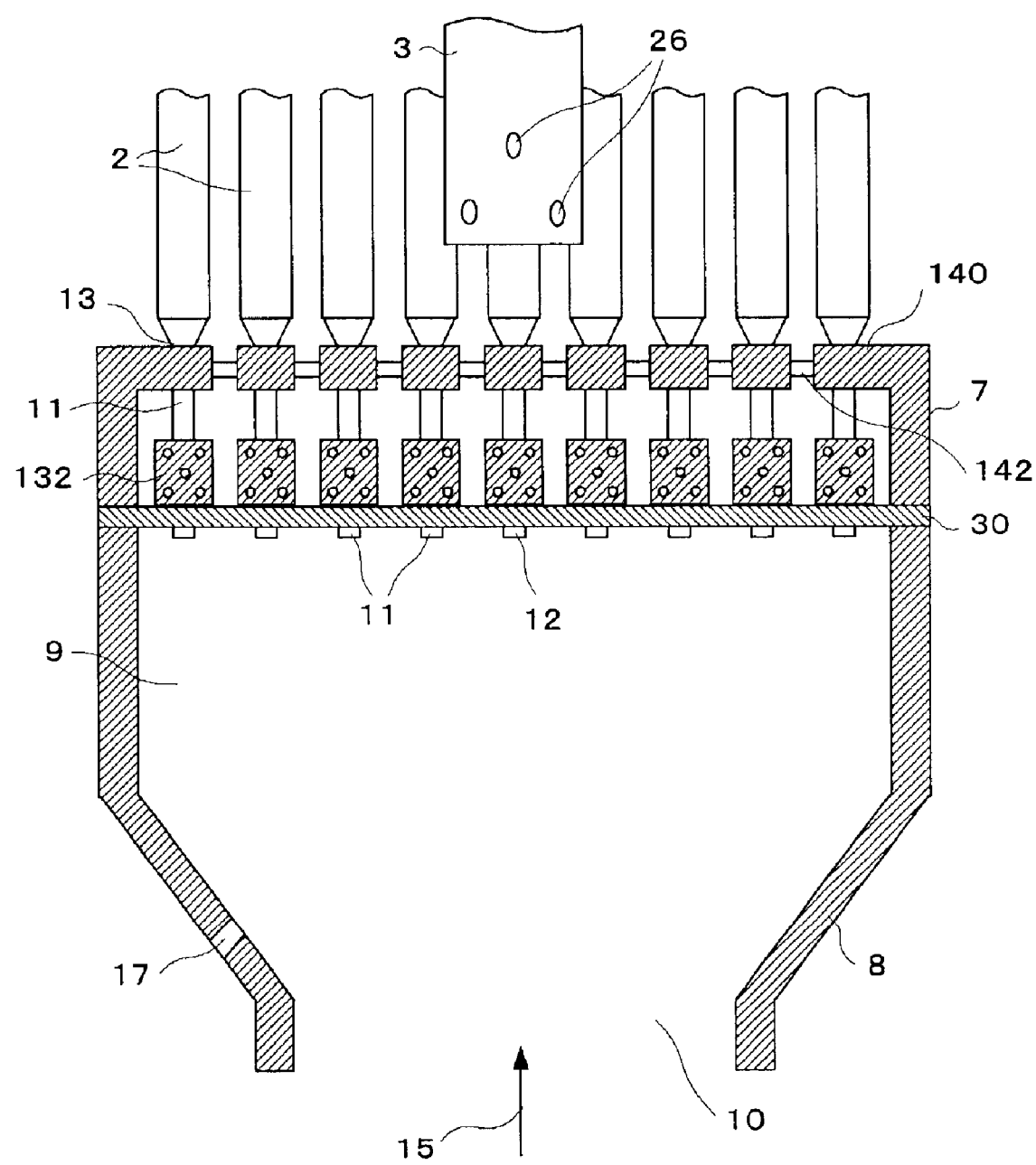
FIG. 21 is a schematic vertical cross-sectional view of a fifteenth embodiment of a lower tie-plate and its vicinity according to the present invention.

FIG. 20 shows a lower tie-plate of the fourteenth embodiment which is similar to the thirteenth embodiment shown in FIG. 19 with exceptions described below. The lower ends of the tubular filters 32 are connected to each other with connecting rods 96. FIG. 20 also show that the tubular filters 32 are connected to the lower end plugs 94 via support bodies 202. Alternatively, the filters 32 may be connected to the lower end plugs 92. According to this embodiment, the filters 32 are firmly fixed, and then, the number of welding points between the filters 32 and the screening plate 30 can be reduced. In addition, even if some of the filters 32 broke into pieces, the pieces would be prevented or suppressed from flowing with the coolant.

Alternatively, only one of the means may be employed—connecting the lower ends of the filters 32 to each other with the connecting rods 96, or supporting the filters 32 with the lower end plugs 92 and/or 94.

In addition, the feature of connecting the filters to each other with connecting rods can be applied to any of the first to the thirteenth embodiments described above.

Figure 22:
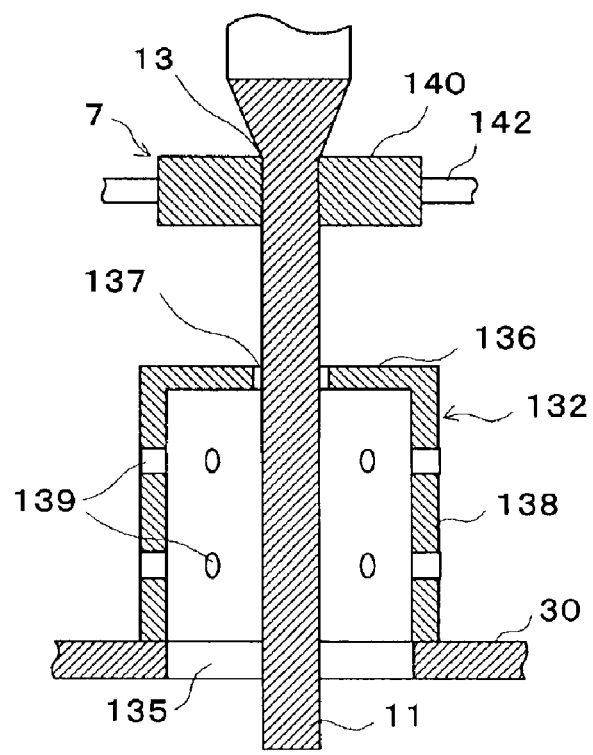
FIG. 22 is an enlarged vertical cross-sectional view of an essential part of the lower tie-plate shown in FIG. 21.

FIGS. 21 through 25 show a lower tie-plate of the fifteenth embodiment according to the present invention. Tubular filters 132 are disposed on the screening plate 30 so that each one of the filters 132 may surround lower part of one of the lower end plugs 11 or 12 which penetrates the screening plate 30. The screening plate 30 has openings 135 and each one of the filters 132 is disposed over one of the openings 135 each, as shown in FIG. 22. The gap between the filter 132 and the opening 135 of the screening plate 30 is small enough to prevent the foreign substances in the coolant from passing through. There are not any openings in the screening plate 30 except the openings 135.

The screening plate 30 may have a thickness of 2 mm, for example. The filter 132 may have a diameter of 12 mm and a height of 20 mm, for example.

The bottom of the filter 132 is open, and the filter 132 is disposed over the opening 135 of the screening plate 30 to cover the opening 135. The filter 132 has a top plate 136 which has a circular hole 137 for the rod portion of one of the lower end plugs 11 or 12 to penetrate. The diameter of the hole 137 may be 7.2 mm, for example, and the gap between the hole 137 and the lower end plug 11 or 12 is small enough to block the foreign substances in the coolant.

The side wall 138 of the filter 132 has a plurality of small holes 139. The holes 139 may be circles with diameters of about 2 mm, for example. Alternatively, the holes 139 may have shapes other than circles, such as polygons or star shapes (not shown).

Figure 24:
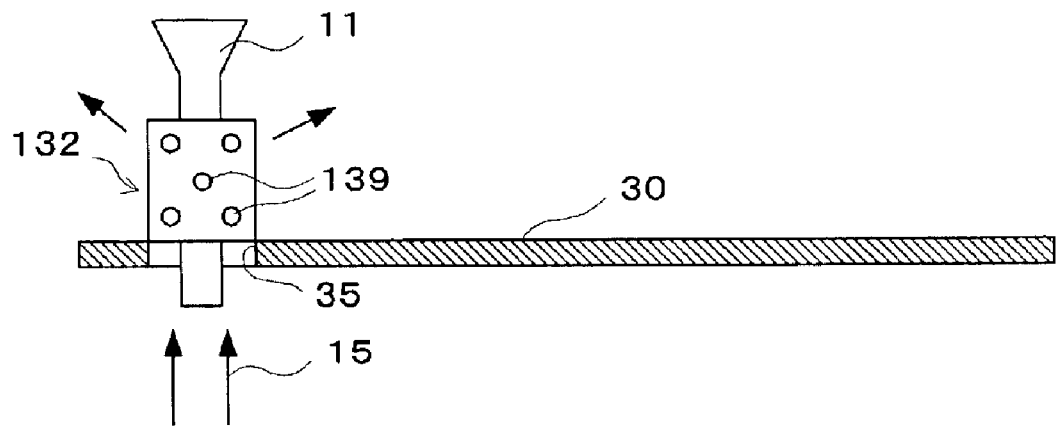
FIG. 24 is a vertical view when only one of the filters shown in FIG. 21 is attached to the screening plate.
Figure 25:
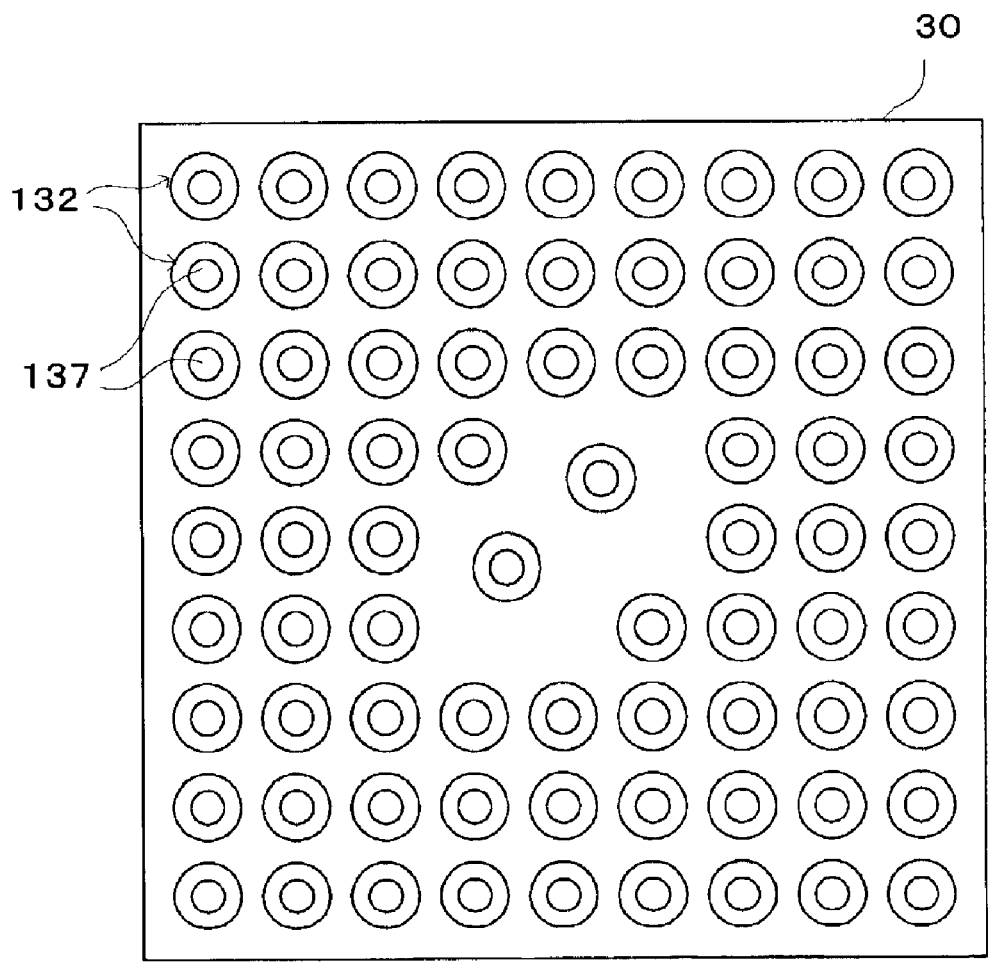
FIG. 25 is a plane view when the filters shown in FIG. 21 are attached to the screening plate.

The central axis of the circular tubular filter 132 is positioned to align with the central axis of the central axis of the lower end plug 11 or 12, as shown in FIG. 25, for example. A lower end plug 11 of a fuel rod is shown in FIGS. 22, 23 and 24 as an example, but the structure would be almost the same if the lower end plug 11 of a fuel rod is replaced with a lower end plug 12 of a water rod.

Figure 23:
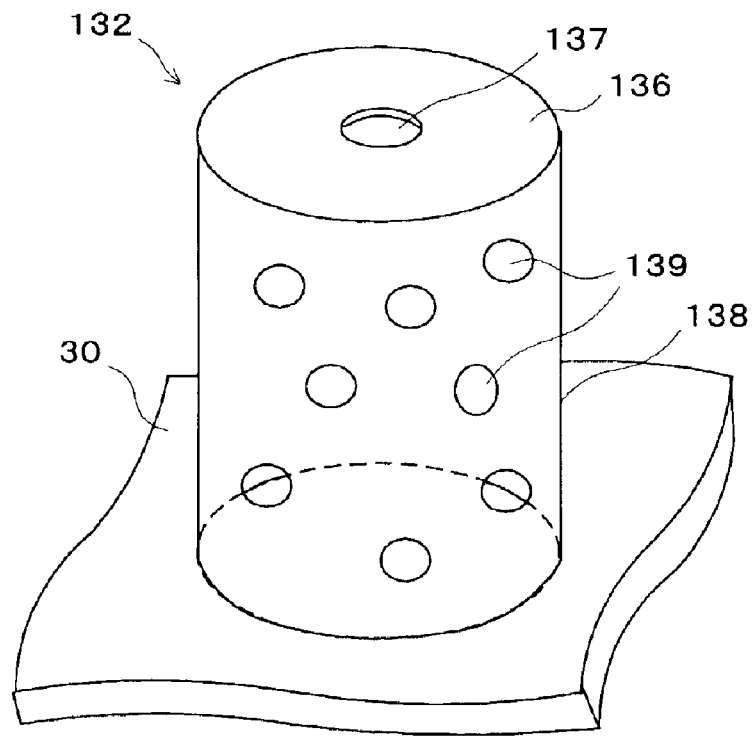
FIG. 23 is a partial perspective view when only one of the filters shown in FIG. 21 is attached to the screening plate.

In assembling the lower tie-plate, the filters 132 are attached to the screening plate 30 first, as shown in FIG. 23. Subsequently, the screening plate 30 is disposed between the network section 7 and the nozzle section 8, and then, they are combined together by welding, for example.

In operation, if a wire-shaped foreign substance (not shown) of a length of 20–30 mm, for example, flows into the lower tie-plate cavity 9 through the lower tie-plate inlet opening 10 with coolant, the foreign substance would flow upward into the filter 132 through the opening 135 in the screening plate 30. The flow of the coolant 15 changes direction to horizontal in the filter 132 and goes out to the space above the screening plate 30 through the holes 139. At that time, the foreign substances would probably remain in the filter 132 because it would be difficult for the wire-shaped foreign substances to change directions. The foreign substances of small plates would also be trapped in the filter 132.

Furthermore even if a large volume of foreign substances emerged due to any malfunction or breach of a plant facility, required coolant flow could be secured. In addition, the foreign substances could be taken out of the reactor vessel with the fuel assemblies when the fuel assemblies are taken out. The filters themselves are reliable in structure and it would be prevented that broken parts of the filters become part of the foreign substances flowing into the channel box of the fuel assembly.

Figure 26:
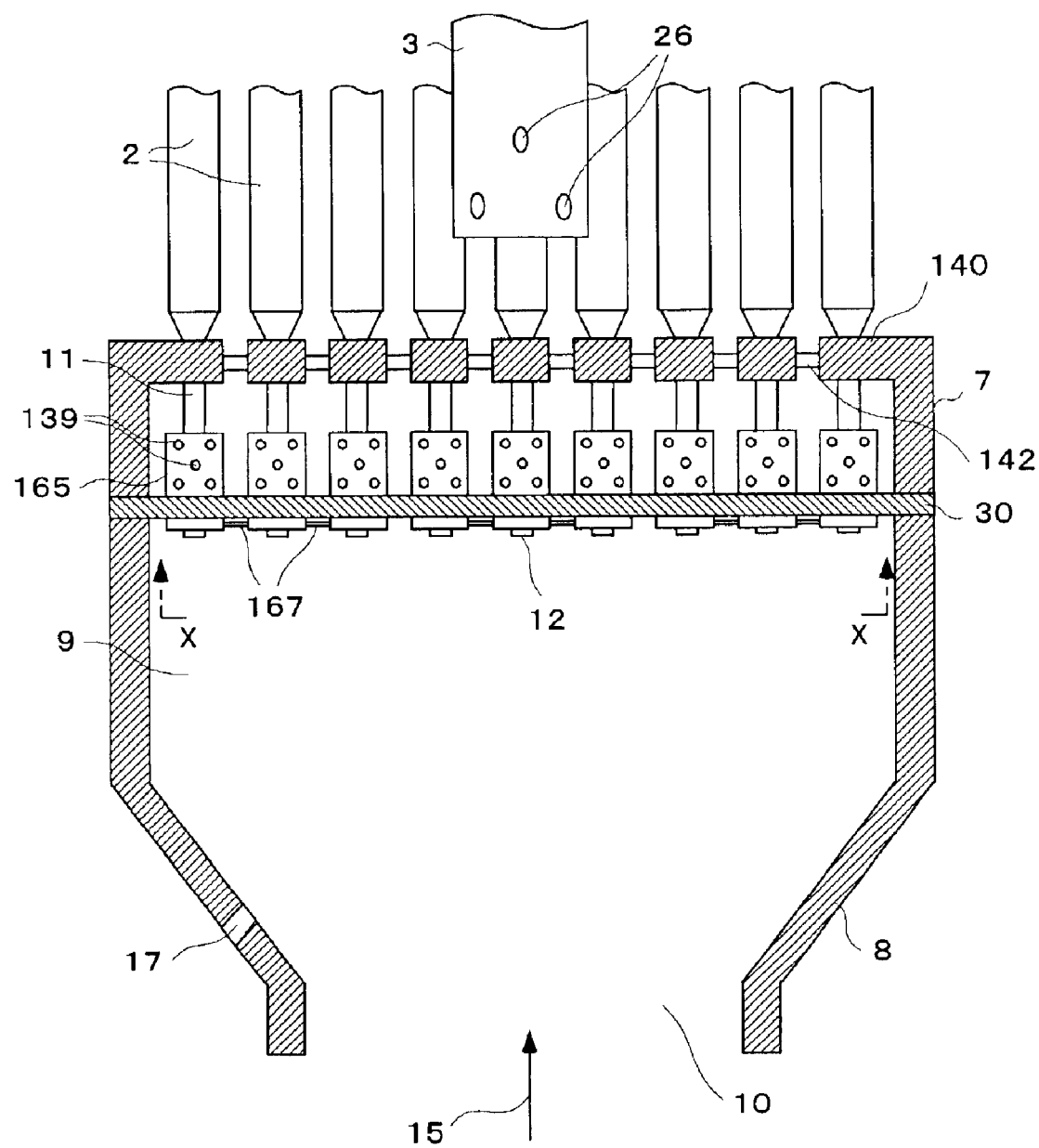
FIG. 26 is a schematic vertical cross-sectional view of a sixteenth embodiment of a lower tie-plate and its vicinity according to the present invention.
Figure 27:
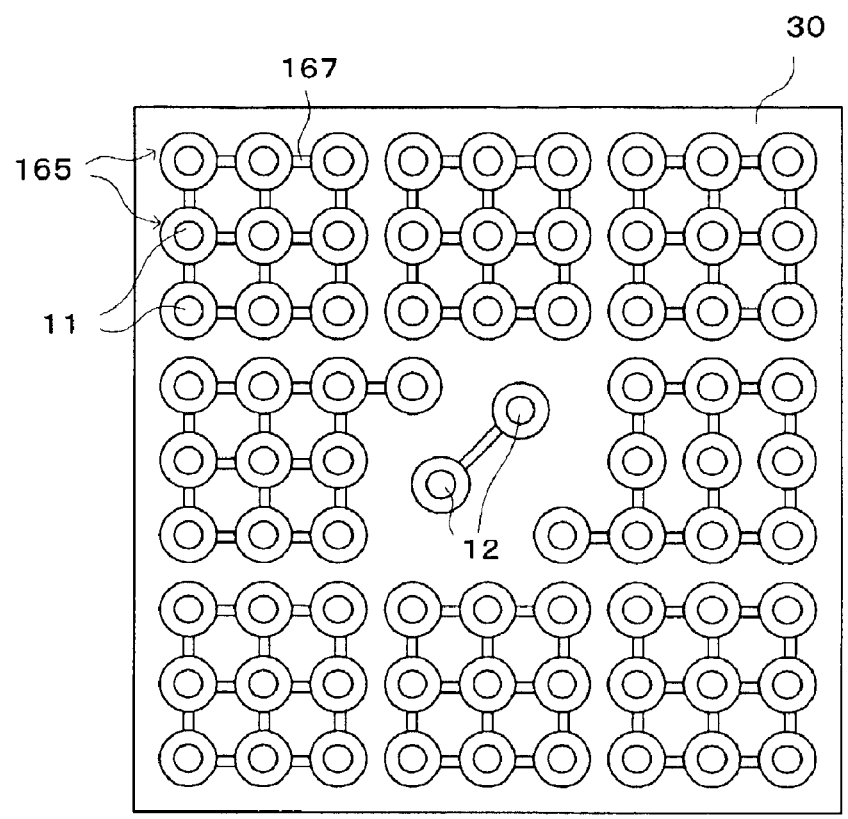
FIG. 27 is a bottom view along Line X—X shown in FIG. 26.
Figure 28:
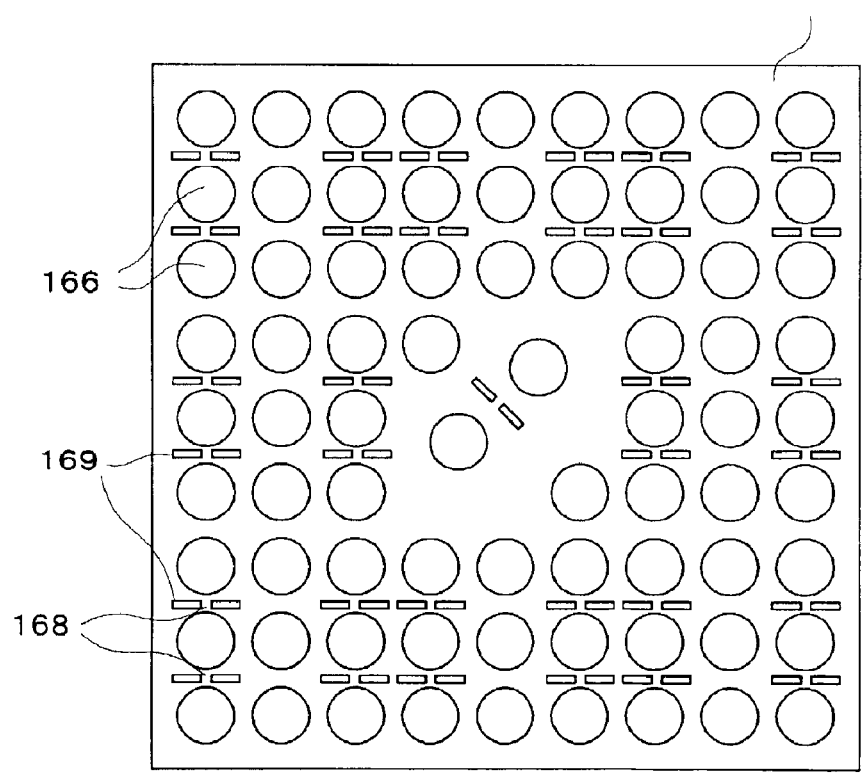
FIG. 28 is a bottom view along Line X—X shown in FIG. 26 before the filters are attached.

FIGS. 26 through 28 show a lower tie-plate of the sixteenth embodiment. Tubular filters 165 are similar to the filters 132 of the fifteenth embodiment shown in FIGS. 21 through 25, but the filters 165 are disposed so that they are held penetrating the openings 166 of the screening plate 30 halfway, instead of being disposed on the upper surface of the screening plate 30 at the openings 135.

The lower tie-plate of this embodiment is formed by combining separate parts of the network section 7, the nozzle section 8 and the screening plate 30 between them, by welding, for example, like the lower tie-plates of the embodiments described above. Then, the filters 165 are inserted into the lower tie-plate cavity 9 through the inlet opening 10 of the nozzle section 8 to attach them to the screening plate 30.

The filters 165 form groups of filters 165, wherein each group includes a plurality of filters 165 combined together with one or more connecting rods 167 which extend horizontally. In the embodiment shown in FIGS. 26 through 28, the filters 165 form nine groups of filters 165, and each of the groups has two to ten filters 165, most of the groups being arranged in 3×3 lattices, as best shown in FIG. 27. The number of groups of filters 165, the number of the filters 165 contained in each group and the shapes of the groups are not limited, but each group should be slim enough to be inserted into the lower tie-plate cavity 9 through the inlet opening 10 of the nozzle section 8.

The bottom surface of the screening plate 30 in this embodiment has grooves 168 for receiving the connecting rods 167. Each of the grooves 168 is formed between two projections 169. The grooves 168 may be formed all locations corresponding to the connecting rods 167, but the number of the grooves 168 can be less than that of the connecting rods 167 as shown in FIG. 28 if all of the groups of the filters 165 can be securely held by the grooves 168.

According to this embodiment, the lower tie-plate can be assembled by inserting the filters 165 after the rest parts other than the filters 165 have been assembled. In addition, the filters 165 which have captured foreign substances can be replaced with new filters, when the fuel assemblies are replaced.

In addition, a plurality of filters 165 are combined together by the connecting rods 167 to form the groups of the filters 165 before the filters 165 are inserted through the inlet opening 10 of the nozzle section 8 to attach them to the screening plate 30. Thus, labor cost for attaching the filters 165 can be reduced compared to a method of attaching each of the filters 165 to the screening plate 30 separately. That is because the work of combining the plurality of filters 165 together with the connecting rods 167 is a relatively easy work which can be done in a wide open space while the work of attaching the filters 165 to the screening plate 30 through the inlet opening 10 of the nozzle section 8 is relatively difficult work.

As a modified version of the sixteenth embodiment described above, the filters 165 may be attached to the screening plate 30 separately without using the connecting rods 167. In this case, the bottom surface of the screening plate 30 should have concavities and/or convexities (not shown) to hold each of the filters 165 instead of the grooves 168 for receiving the connecting rods 167.

As another modified version of the sixteenth embodiment described above, the network section 7, the screening plate 30 and the nozzle section 8 may be formed in a single unit by casting, for example, instead of being formed by combining separate parts with welding, for example. This can be accomplished because the filters 165 are inserted and attached to the screening plate 30 after the rest part of the lower tie-plate is formed. Thus, the process of forming the lower tie-plate can be the same as that of the prior art except the step of attaching filters 165.

In the process of forming the lower tie-plate of the fifteenth or the sixteenth embodiment described above, the filters can be in any shapes including circular cylinders, tapered cylinders and polygonal cylinders.

In addition, any of the filters of the first to sixteenth embodiments including their modified versions can be combined in a single lower tie-plate.

Numerous modifications and variations of the present invention are possible in light of the above teachings. It is, therefore, to be understood that, within the scope of the appended claims, the present invention can be practiced in a manner other than as specifically described herein.

What is claimed is:

1. A nuclear fuel assembly lower tie-plate comprising:
    a network section having a plurality of holes for receiving end plugs of fuel rods loaded with nuclear fuel so that the fuel rods above the network section are held in a lattice spaced one from the other above the network section, the network section having flow passages between said holes for coolant to flow through;
    a nozzle section extending downward from a peripheral part of the network section and defining a lower tie-plate cavity below the network section, the nozzle section having an inlet opening at its lower end;
    a screening plate positioned below the network section in the lower tie-plate cavity, the screening plate being disposed substantially horizontally so that the lower tie-plate cavity is divided into upper and lower cavity parts by the screening plate; and
    a plurality of tubular filters attached to the screening plate so that the tubular filters each have at least one opening below the screening plate and at least one opening above the screening plate and below the network section; top ends of the tubular filters being closed, and the openings above the screening plate being formed in side walls of the tubular filters, enabling the screening plate and the tubular filters to prevent foreign substances entrained by the coolant from flowing into the upper cavity part of the lower tie-plate cavity bypassing the tubular filter.

2. The nuclear fuel assembly lower tie-plate according to claim 1, wherein the tubular filters are tapered toward the top ends.

3. The nuclear fuel assembly lower tie-plate according to claim 1, wherein:
    the tubular filters are formed slenderer above the screening plate than below the screening plate; and
    the screening plate has screening plate bores through which upper portion of the tubular filers above the screening plate can penetrate and lower portion of the tubular filters below the screening plate cannot penetrate.

4. The nuclear fuel assembly lower tie-plate according to claim 1, wherein horizontal annular collars are attached to outer peripheries of the tubular filters, the horizontal annular collars being combined to the screening plate.

5. The nuclear fuel assembly lower tie-plate according to claim 1, further comprising bottom bodies, the bottom bodies including:
    annular collars extending along a lower surface of the screening plate outwardly from screening plate bores formed in the screening plate; and
    tubular sections connected to inner rims of the annular collars and extending upward through the bores of the screening plate, the tubular sections having openings at their top ends above an upper surface of the screening plate;
    wherein the tubular filters are arranged vertically on the upper surface of the screening plate so that the tubular filters surround the tubular sections of the bottom bodies.

6. The nuclear fuel assembly lower tie-plate according to claim 1, wherein the tubular filters each has:
    a bottom opening formed at a bottom end of the tubular filter, the bottom opening facing downward;
    a first shrinking part where flow area shrinks smoothly from the downward-facing opening upward;
    a large horizontally facing bore formed above the shrinking part and above the screening plate;
    a second shrinking part where flow area shrinks upwardly and smoothly, the second shrinking part being formed above the large horizontally facing bore; and
    a small horizontally facing bore formed above the second shrinking part, the small horizontally facing bore being smaller than the large horizontally facing bore.

7. The nuclear fuel assembly lower tie-plate according to claim 1, wherein at least part of the tubular filters register substantially vertically below centers of the flow passages.

8. The nuclear fuel assembly lower tie-plate according to claim 1, wherein: the tubular filters extend below the screening plate; and the nuclear fuel assembly lower tie-plate further comprises a connecting body for connecting the filters to each other under the screening plate.

9. The nuclear fuel assembly lower tie-plate according to claim 1 in combination with a plurality of fuel rods, wherein:
    the fuel rods have lower end plugs extending below the screening plate;
    the tubular filters extend below the screening plate; and
    the nuclear fuel assembly lower tie-plate further comprises a connecting body for connecting the filters and the lower end plugs to each other under the screening plate.

10. A nuclear fuel assembly comprising:
    a lower tie plate;
    a plurality of fuel rods;
    a network section for holding lower parts of fuel rods loaded with nuclear fuel so that the fuel rods are held in a lattice with spaces therebetween;
    a nozzle section extending downward from peripheral part of the network section for forming a lower tie-plate cavity below the network section, the nozzle section having an inlet opening at its lower end;
    a screening plate positioned below the network section in the lower tie-plate cavity, the screening plate being arranged substantially horizontally so that the lower tie-plate cavity is divided into upper and lower parts by the screening plate; and
    a plurality of tubular filters attached to the screening plate, the tubular filters each having at least one opening below the screening plate and at least one opening above the screening plate;

wherein:

at least part of the fuel rods have lower end plugs including rod portions extending downward;

upper parts of the plurality of tubular filters are positioned surrounding the rod portions, and gaps between the upper portions of the tubular filters and the rod portions are substantially closed; and the openings above the screening plate are disposed mainly on side walls of the tubular filters.

11. The nuclear fuel assembly lower tie-plate according to claim 1 wherein each of the tubular filters has a plurality of openings above the screening plate.

12. In an elongated nuclear fuel assembly having a plurality of fuel rods, spacers at axially spaced positions along the length of the assembly for maintaining spacing between the fuel rods, and a lower tie-plate having a network section with a plurality of holes for receiving end plugs of the fuel rods, flow passages between the end plug holes and a lower tie-plate cavity having an inlet below the network section for receiving coolant fluid, the improvement comprising a filter assembly including a screening plate positioned below the network section in the lower tie-plate cavity, the screening plate being disposed substantially horizontally so that the lower tie-plate cavity is divided into upper and lower cavity parts by the screening plate; and a plurality of tubular filters attached to the screening plate so that the tubular filters each have at least one opening below the screening plate and at least one opening above the screening plate and below the network section; top ends of the tubular filters being closed, and the openings above the screening plate being in side walls of the tubular filters, enabling the screening plate and the tubular filters to prevent foreign substances entrained by the coolant from flowing into the upper cavity part of the lower tie-plate cavity bypassing the tubular filters.

13. A nuclear fuel assembly according to claim 12 including at least part of the tubular filters registering substantially vertically below the centers of the flow passages and the space of the lattice between the fuel rods.

* * * * *